US005784646A

United States Patent [19]

Sawada

[11] Patent Number: 5,784,646
[45] Date of Patent: Jul. 21, 1998

[54] HIERARCHICAL DATA STORAGE PROCESSING APPARATUS FOR PARTITIONING RESOURCE ACROSS THE STORAGE HIERARCHY

[75] Inventor: Yoshiaki Sawada, Tokyo, Japan

[73] Assignee: Sony Corporation, Tokyo, Japan

[21] Appl. No.: 557,124

[22] PCT Filed: Apr. 25, 1995

[86] PCT No.: PCT/JP95/00810

§ 371 Date: Dec. 7, 1995

§ 102(e) Date: Dec. 7, 1995

[87] PCT Pub. No.: WO95/29444

PCT Pub. Date: Nov. 2, 1995

[30] Foreign Application Priority Data

Apr. 25, 1994 [JP] Japan .................................. 6-110528

[51] Int. Cl.⁶ .......................... G06F 12/00; G06F 12/02
[52] U.S. Cl. ..................... 395/858; 707/205; 711/4; 395/200.47
[58] Field of Search ..................... 395/828, 858, 395/444, 856, 200.47, 200.33; 707/205; 711/117, 100, 111, 112, 4

[56] References Cited

U.S. PATENT DOCUMENTS

| 4,207,609 | 6/1980 | Luiz et al. | 395/858 |
|---|---|---|---|
| 4,396,984 | 8/1983 | Videki | 395/858 |
| 4,455,605 | 6/1984 | Cormier et al. | 395/858 |
| 4,974,156 | 11/1990 | Harding et al. | 395/489 |
| 4,987,533 | 1/1991 | Clark et al. | 395/620 |
| 5,239,650 | 8/1993 | Hartung et al. | 395/828 |
| 5,412,791 | 5/1995 | Martin et al. | 395/441 |
| 5,418,971 | 5/1995 | Carlson | 395/408 |
| 5,459,848 | 10/1995 | Mase | 395/412 |
| 5,469,560 | 11/1995 | Beglin | 395/439 |
| 5,479,581 | 12/1995 | Kleinschnitz | 395/82 |
| 5,572,694 | 11/1996 | Uchino | 395/406 |

FOREIGN PATENT DOCUMENTS

| 5-274200-A | 1/1993 | Japan . |
|---|---|---|
| 5-189286-A | 6/1993 | Japan . |
| 5-334145-A | 8/1993 | Japan . |
| 5-40582-A | 9/1993 | Japan . |

*Primary Examiner*—Dinh C. Dung
*Attorney, Agent, or Firm*—Limbach & Limbach LLP; Seong-Kun Oh

[57] ABSTRACT

The present invention relates to a data storage processing apparatus and the object of the present invention is to provide storages including off-line media and to improve the usability of users as well as removing the unfairness among users. The resource of data storage processing will be divided and dynamically allocated and simultaneously various multiple storages in the resource of the data storage processing will be integrated in accordance with file systems and hierarchically arranged according to speeds and features, and file systems will be constructed on that hierarchical various multiple storages, and thus, users are able to access to the optional files making no distinction of various multiple storages and/or file system.

1 Claim, 23 Drawing Sheets

| SLOT NO. 1 | ACCESS COUNT | STAGING INFORMATION | MEDIA LOCK /UNLOCK | MEDIA NUMBER | GARDEN NUMBER | REMAINDER CAPACITY DATA |
|---|---|---|---|---|---|---|
| SLOT NO. 2 | ACCESS COUNT | STAGING INFORMATION | MEDIA LOCK /UNLOCK | MEDIA NUMBER | GARDEN NUMBER | REMAINDER CAPACITY DATA |
| ⋮ | ⋮ | ⋮ | ⋮ | ⋮ | ⋮ | ⋮ |
| SLOT NO. n | ACCESS COUNT | STAGING INFORMATION | MEDIA LOCK /UNLOCK | MEDIA NUMBER | GARDEN NUMBER | REMAINDER CAPACITY DATA |

TBL31

HIERARCHICAL DATA STORAGE PROCESSING APPARATUS FOR PARTITIONING RESOURCE ACROSS THE STORAGE HIERARCHY

TECHNICAL FIELD

The present invention relates to a data storage processing apparatus and is suitably applied to the network storage server based on the client/server model.

BACKGROUND ART

Heretofore, as a data storage processing device (network storage server) based on the client/server model to be commonly used by a plurality of users via network, there has been a network file system server which connects a juke box having a built-in magnetic disc and a magneto-optical disc to a workstation and loaded with a device driver, a unique file system and a management software of the file device on a part of its operating system on the workstation.

This network file system server uses a software which makes the computer storage/file server connected to the network usable as if it were its own computer storage via the network. More specifically, it mounts the storage of the other computer in the directory on its computer via the network. By means of this network file system server the user can connect the network storage having large capacity to his own computer via the network and can utilize it.

The special features of this network file system (NFS) server are firstly, bit cost decreases by connecting the juke box through making use of high speed of the magnetic disc file server, secondly, all removable storage media in the juke box are controlled as one volume. This means that the system controls the volume of removable media as an extended space of the magnetic disc and the user cannot use individual removable media freely.

Thirdly, the network file system server has adopted the file system which treats the juke box as a part of the magnetic disc and the server deals with only one file system. Fourthly, by conducting automatic file migration between storage hierarchy of the magnetic disc and the juke box, access speed approaches to the magnetic disc. Also by physically connecting a plurality of juke boxes, "infinite" to infinitely large capacity file. Lastly, its management target is only on-line storage and does not exchange media during the system working condition, nor does it perform off-line media management.

Thus, the network file system server has the storage construction of which semiconductor memory, magnetic disc, optical disc and magneto-optical disc are hierarchized according to the access speed, and controls resources which the server has by means of hierarchical storage management.

However, since the hierarchization according to access speed is conducted in the NFS server, the device which brings the access turn around time closer to the access time of high speed storage such as the magnetic disc, has been derived. However, since the on-line storage capacity management for each client has not been conducted, it has created a problem that unfairness occurs among clients concerning the on-line capacity of storage which the client has. Here, the client indicates the client in the client/server model.

Furthermore, since the hierarchical management has been conducted only for the on-line storage, it has created a problem that the storage media cannot be exchanged during the system working condition when using storage having removable storage media which allows the magneto-optical disc to be removed. This means that the media containing users' files cannot be accessed at all after the system starts operating.

Moreover, there are various file systems corresponding to the quality of data and characteristics of storages at the present. However, since the hierarchical storages are treated as one large volume, it is a problem that only one file system can exist in the system. This means that users' files and data which are constructed by the file system unsupported by the system cannot be accessed.

Furthermore, there is a tendency that each client's file and data increase in the on-line storage. On the other hand, since files having low access frequency and files which are no longer accessed are held in the on-line storage, the usability of on-line storage decreases. Also, since the removable media are entirely controlled by the system, it has created a problem that the client cannot independently handle the removable storage media which he has in the system.

The present invention has been done considering the above points and is proposing a data storage processing apparatus which is capable of improving the usability of the user as well as removing the unfairness among users.

DISCLOSURE OF INVENTION

To obviate such problems according to the present invention, resources of the data storage processing (2, 3, 4, 5, 6, 7, 8, 9) is divided and dynamically allocated to users, various multiple storages (2, 6, 7, 14) comprising storage resources in the data storage processing resources (2–9) is integrated by the file system and hierarchized according to speeds and features, and the file system is constructed on various multiple storages hierarchized (2, 6, 7, 14) and users can access the optional files without making distinction between various multiple storages (2, 6, 7, 14) and/or file systems.

As well as dividing and dynamically allocating resources (2–9), various multiple storages (2, 6, 7, 14) is integrated by the file system and hierarchized according to the speed and characteristics, and since the file systems are constructed on hierarchical various multiple storages (2, 6, 7, 14) and users are able to access to the optional files making no distinction of various multiple storages (2, 6, 7, 14) and/or file systems, the usability of the user is improved and unfairness among users is removed.

BEST MODE FOR CARRYING OUT THE INVENTION

Figure 1:
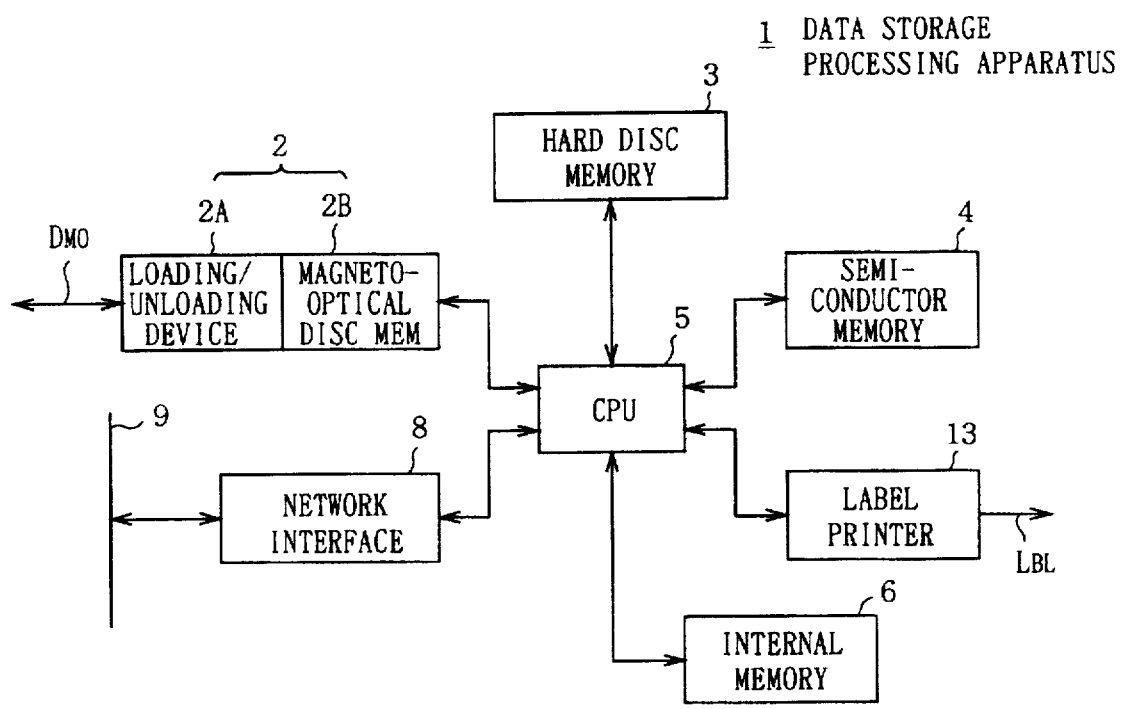
FIG. 1 is a block diagram showing the general construction of a data storage processing apparatus according to one embodiment of the present invention.

Referring to the drawings, one embodiment of the present invention will be hereinafter described in detail.

(1) General Construction of Data Storage Processing Apparatus

FIG. 1 generally shows a data storage processing apparatus 1. As the first storage, this data storage processing apparatus 1 has an auto changer 2 which stores the first storage media, i.e., magneto-optical disc into the magneto-optical disc memory 2B in order that it can be removed from the outside by the loading/unloading device 2A, and as the second and the third storages, it possesses a hard disc memory 3 and a semiconductor memory 4 having the second and third storage media, i.e., a hard disk and a semiconductor random access memory (RAM), and it is able to conduct the write processing or read processing of data in the storage area of the magneto-optical disc, the hard disc and the semiconductor memory element according to softwares, such as the operating system and management software stored in the internal memory 6 by the central processing unit 5 (CPU). As the auto changer 2, a device such as a juke box can be applied.

Figure 2:
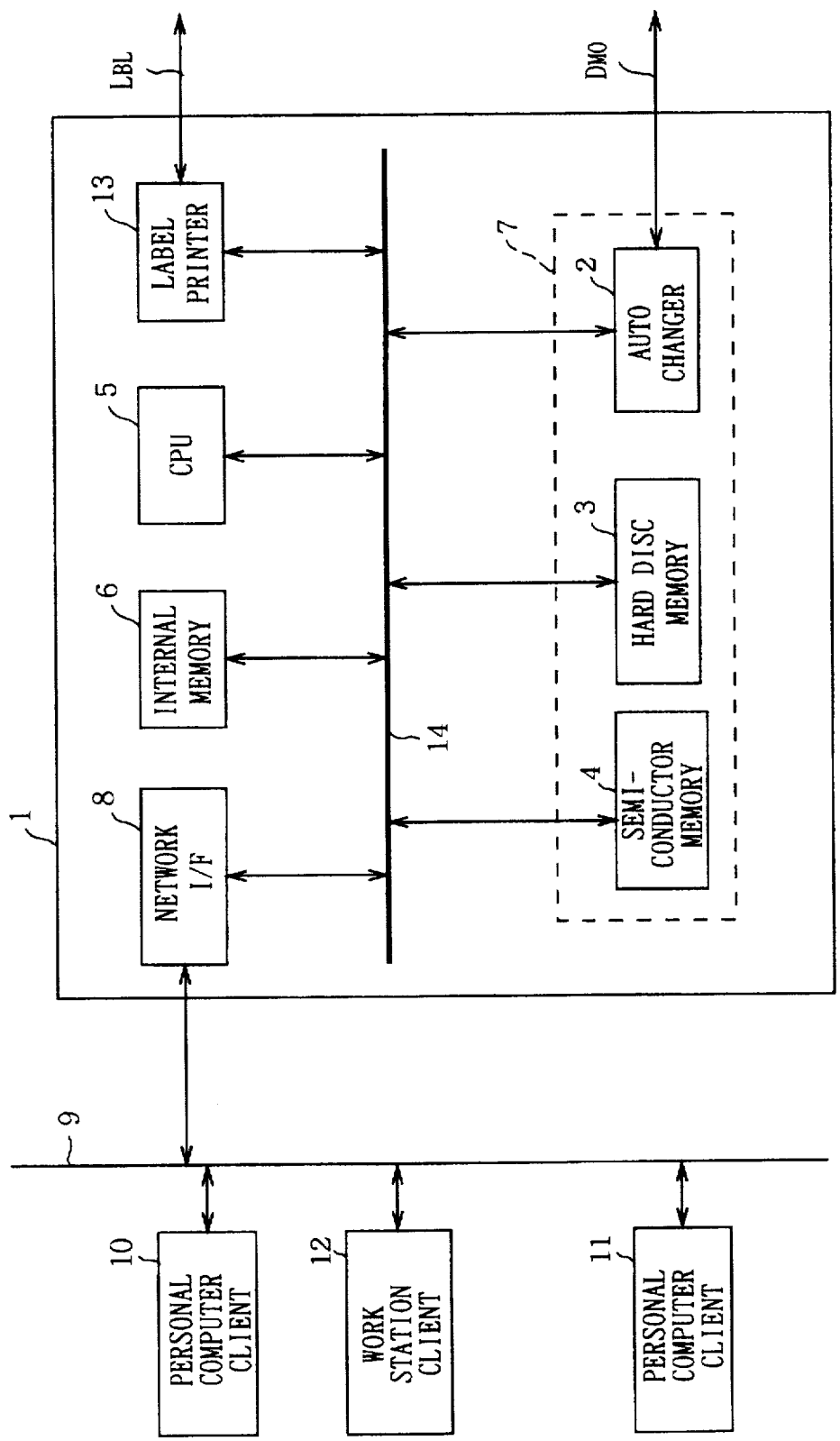
FIG. 2 is a block diagram showing the construction of the data storage processing apparatus.

At this point, as shown in FIG. 2, the data storage processing apparatus 1 controls various kinds of storages, such as the semiconductor memory 4, the hard disc memory 3 and the magneto-optical disc memory 2, the access time of which during write processing and read processing gradually increases in the respective order, as one storage 7 as a whole via bus 6.

Thus, the CPU 5, by connecting the data to be written in or read from the storage 7 to the network 9 of such as Ethernet, FDDI (fiber distributed data interface) via the network interface 8, connects the clients connected to the network 9, i.e., computer file system including personal computer client 10 and 11 and workstation client 12 as the NFS (Network File System) and transmits and receives the data.

The data storage processing apparatus 1, after storing the data from clients of the file system in the magneto-optical disc memory 2B which is the first storage media, by the auto changer 2, outputs the stored magneto-optical disc Dmo by the loading/unloading device 2A and stored in the external storage by the operator, and thus, the data can be stores externally.

At the time when the magneto-optical disc Dmo is outputted from the loading/unloading device 2A, the CPU 5 prints the access information allocated to the outputted magneto-optical disc Dmo on the label Lbl by label printer 12 and supplies it to the operator for the operator to post the label Lbl supplied on the outputted magneto-optical disc Dmo and to store it.

As a result, when the data storage processing apparatus 1 receives the access information from clients 10, 11 and 12 for the data memorized in the magneto-optical disc Dmo which is stored in the external storage, it informs the operator the access information so that the operator easily finds the corresponding magneto-optical disc Dmo and is able to install it to the loading/unloading device 2A of the auto changer 2.

(2) Storage Resources Management

Figure 3:
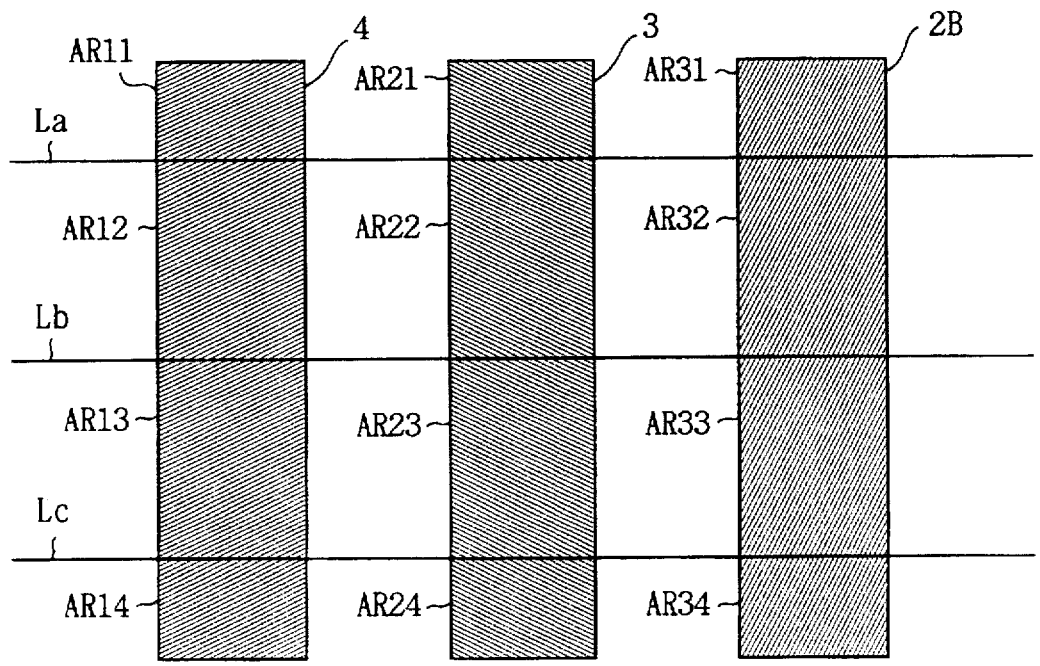
FIG. 3 is a linear diagram illustrating the division of resources in the data storage processing apparatus.

The CPU 5 and the network interface 8, the semiconductor memory 4, the hard disc memory 3 and the magneto-optical disc mounted to the slot of the auto changer 2 in the storage 7 are resources of the data storage processing apparatus 1 and as shown in FIG. 3, divided by the dividing lines La, Lb and Lc as a plurality of resource working sets, and is dynamically allocated (i.e., in order that they can be changed as the time proceeds) to the software which manages the divided resource working sets (hereinafter referred to as garden).

More specifically, storage capacities of the semiconductor memory 4, the hard disc memory 3 and the magneto-optical disc memory 2B are divided by the partition lines La, Lb and Lc respectively, and thus, the semiconductor memory 4 is cut out into four (4) memory areas AR11–AR14, and in the similar manner, the hard disc memory 3 is divided into four (4) memory areas AR21–AR24 and, moreover, the magneto-optical disc memory 2B is divided into four (4) memory areas AR31–AR34.

Figure 4:
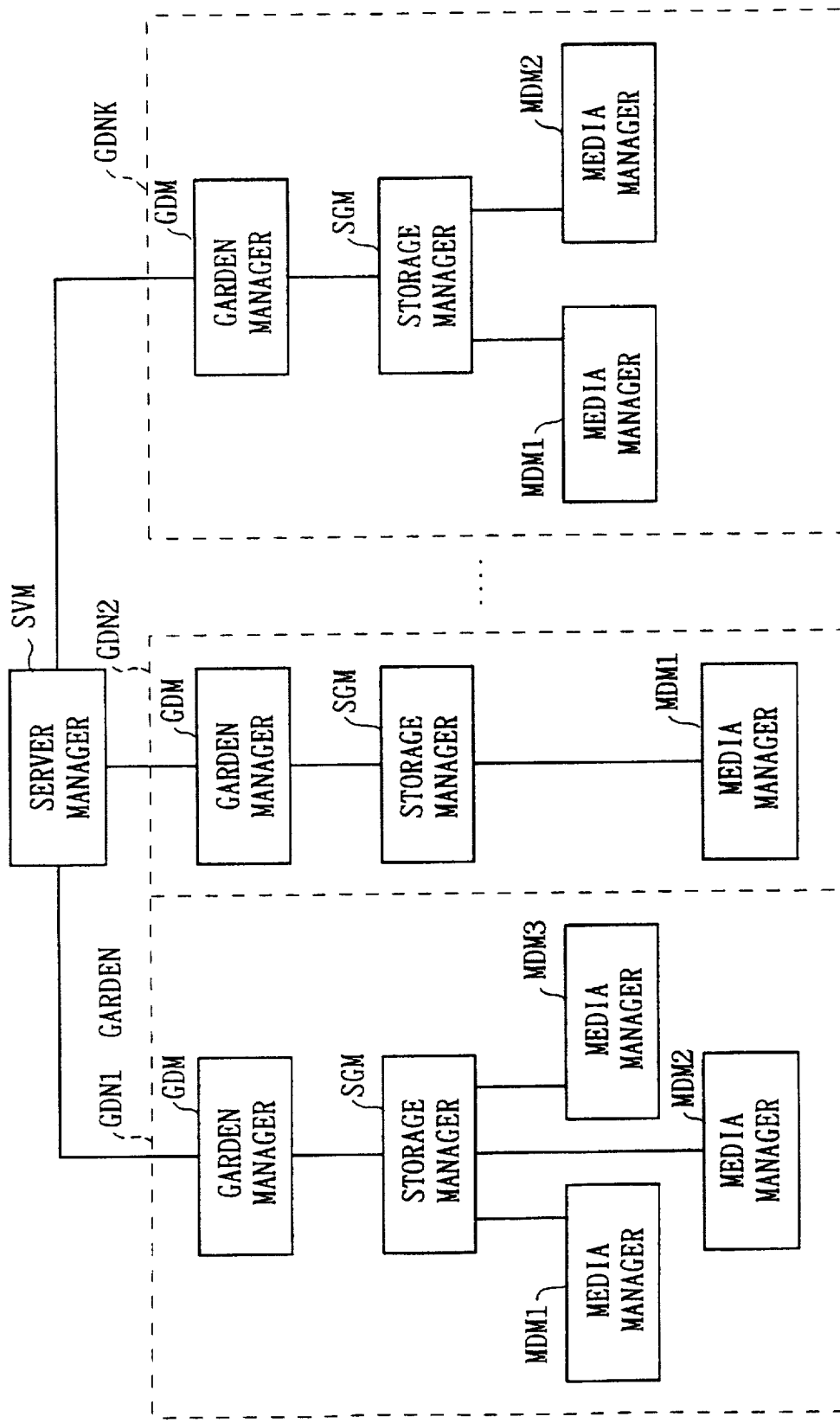
FIG. 4 is a linear diagram illustrating the software management module of the divided resources in the data storage processing apparatus.

Then, the working sets of cut out resources are dynamically managed by the corresponding software management module respectively as shown in FIG. 4. In FIG. 4, the server manager SVM is a module for managing the overall resources of the data storage processing apparatus 1, forming a plurality of gardens GDN1–GDN3 for managing the divided working sets of divided resources, and dynamically allocates resources of the data storage processing apparatus 1 upon dividing in gardens GDN1, GDN2 ... GDNk as the working sets of resources.

In this connection, in the case of the embodiment of FIG. 3, memory areas AR11, AR21 and AR31 of the semiconductor memory 4, the hard disc memory 3 and the magneto-optical disc memory 2B are allocated to the first garden GDN1. Also, memory areas AR12, AR22 and AR32 of the semiconductor memory 4, the hard disc memory 3 and the magneto-optical disc memory 2B are allocated to the second garden GDN2 and memory areas AR1K, AR2K and AR3K of the semiconductor memory 4, the hard disc memory 3 and the magneto-optical disc memory 2B are allocated to the kth garden GDNK.

The gardens GDN1, GDN2, ... GDNK are constructed by a garden manager GDM, a storage manager SGM and media managers MDM1, MDM2 ... respectively. One garden manager GDM and one storage manager SGM exist in each garden GDN and media managers MDM1, MDM2 ... exist in each slot obtained as working sets of resources in the magneto-optical disc memory 2B of the auto changer 2.

Accordingly, the relation between the working sets of divided resources and allocated gardens GDN1, GDN2, ... GDNk are 1:1 respectively. And thus, each garden GDN1, GDN2 ... GDNK is able to have the working set of resources physically usable from the other gardens exclusively.

(3) Hierarchization of Storage Resources and File System Processing

The data storage processing apparatus 1 of this embodiment executes the hierarchization for the storage 7 (FIG. 2) due to the difference in capacity and/or access speed by hierarchically arranging storage resources of the storage 7 comprising the semiconductor memory 4, the hard disc memory 3 and the magneto-optical disc memory 2B of the auto changer 2 according to capacity and/or access speed.

In practice, the storage having small capacity and high speed like the semiconductor memory 4 is arranged as the storage to be accessed most frequently by the client of the data storage processing apparatus 1 the storage having medium capacity and medium speed such as the hard disc 3 is arranged as the storage to be secondly most frequently accessed, and the storage with large capacity and low speed like the magneto-optical disc memory 2B of the auto changer 2 is arranged as the storage to be thirdly frequently accessed.

With this storage resource hierarchization, the storage structure having high speed and large capacity and efficient cost performance can be realized.

In the case of this data storage processing apparatus 1, hierarchization according to access speed and/or capacity of storage resources is applied per working set of resources which are divided areas of resources described above in FIG. 3. Accordingly, the management of gardens GDN1, GDN2 ... GDNK which are substances for managing the working set of resources is executed by the garden manager GDM which exists uniquely in each garden for its own working set of resources as shown in FIG. 5.

Figure 5:
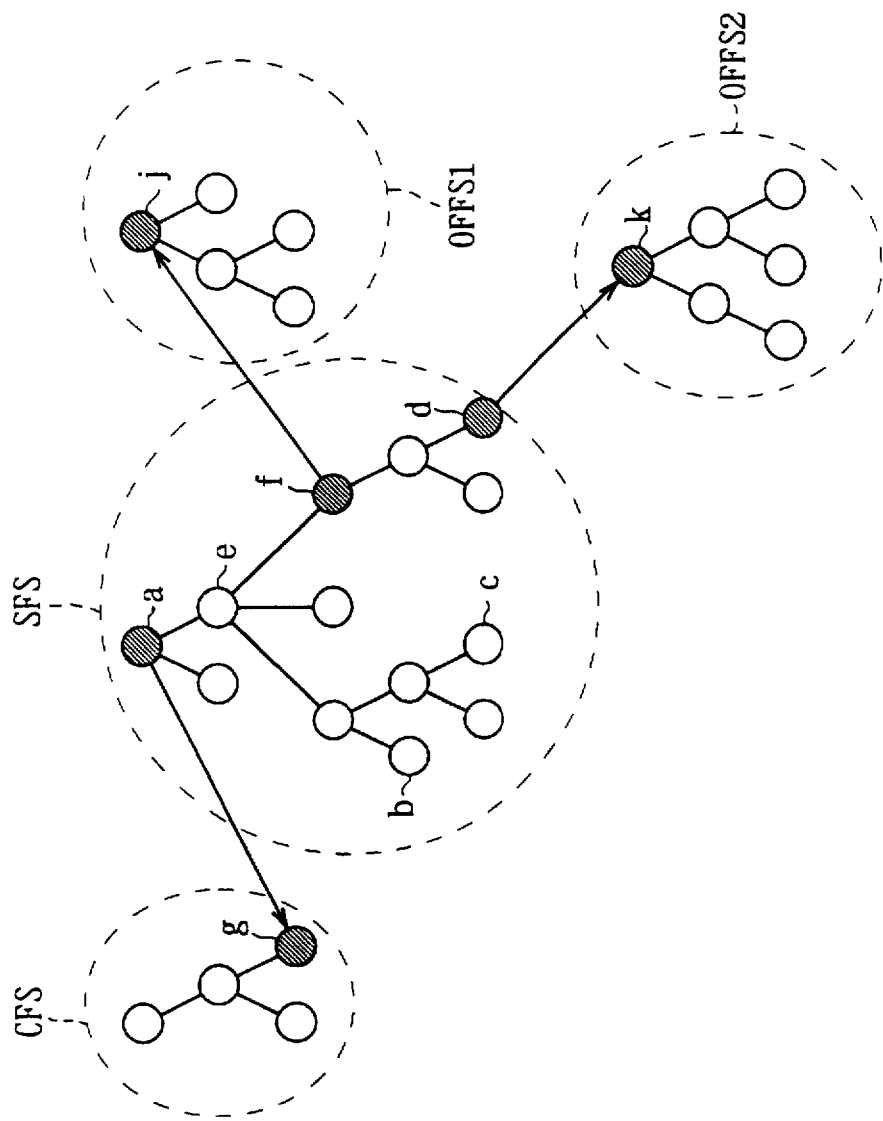
FIG. 5 is a linear diagram illustrating the integration of various multiple file systems in the data storage processing apparatus.

In FIG. 5, in the working set of resources to be managed by each garden GDN1, GDN2 ... GDNK, the server file system SFS is introduced to various multiple storage resources (the plural number of identical storage resources may exist in the same hierarchy) hierarchically arranged in the order of the semiconductor memory 4, the hard disc memory 3, the magneto-optical disc memory 2B of the auto changer 2, and the framework to combine hierarchical storage resources is constructed by one storage manager SGM in each garden GDN. Accordingly, the server file system SFS has file management structure proper to this data storage processing apparatus 1.

The working set of storage resources divided by the server manager SVM is dynamically allocated (i.e., so as to change with time) to the garden GDN formed by the server manager SVM, and thus the file system can be constructed on hierarchical various multiple storages to be executed by the storage manager SGM.

In practice, gardens GDN1, GDN2 ... GDNK which are dynamically allocated the working set of resources hierarchically arranged the storage resources by designing the way to call out the garden manager GDM of each garden.

More specifically, the garden manager GDM calls out the storage manager SGM, and the called storage manager SGM constructs the server file system SFS on the hierarchical storage. The server file system SFS has a tree structure including a root a and leaves b, c, d. Nodes e, f, d of each file is placed physically in the hierarchical working set of resources, i.e., divided memory areas of the semiconductor memory 4, the hard disc memory 3 and the magneto-optical disc memory 2B, by the storage manager SGM as the on-line storage.

Furthermore, the client file system CFS is constructed on the storage held by the computer of each client, such as personal computer client 10, 11, and workstation client 12, and by connecting nodes when occasion demands, the server file system SFS constructed on the storage 7 held by the data storage processing apparatus 1 is connected with the client file system CFS.

For example, by connecting (hereinafter referred to as mounting) the node a of the server file system SFS to node g in the client file system CFS, the server file system SFS can be inputted as a part of client file system CFS through the network interface 8 (FIG. 2). This means that the tree structure of files of the client file system CFS has an extended tree structure inclusive of the tree structure of files held by the server file system SFS by mounting the node g.

Thus, the client file system CFS is extended to the server file system SFS, and the user (the client in the client/server model) can access to the server file system SFS as a part of the client file system CFS. Accordingly, users of this data storage processing apparatus 1 can access files in the server file system SFS through the client file system CFS without being aware of the physical location of storage wherein files are hierarchically arranged.

As shown in FIG. 5, the tree structure of the server file system SFS is constructed on the storage 7 (hereinafter referred to as on-line storage) which is constantly access controlled in a state connected to the CPU 5. On the other hand, as shown in FIG. 6, the auto changer 2 comprising part of the storage 7 has the on-line storage section ONS which is constructed by magneto-optical discs as storage media stored inside and the off-line storage section OFS which is constructed by magneto-optical discs as removable storage media stored outside via the loading/unloading device 2A, and each node of the tree structure of the off-line storage section ONS is constructed on magneto-optical discs Dmo1–Dmo4 which construct the on-line storage section ONS and the off-line file system OFFS1 and OFFS2 having a similar tree structure to that of the server file system SFS is constructed on the magneto-optical disc composing the off-line storage section OFS.

Nodes j and k of the off-line file system SFFS1 and OFFS2 are connected to nodes f and d of the server file system SFS respectively, and thus, the off-line file system OFFS1 and OFFS2 function as a part of the server file system SFS and then as a part of the client file system CFS. As a result, this means that the client file system is expanded.

Figure 6:
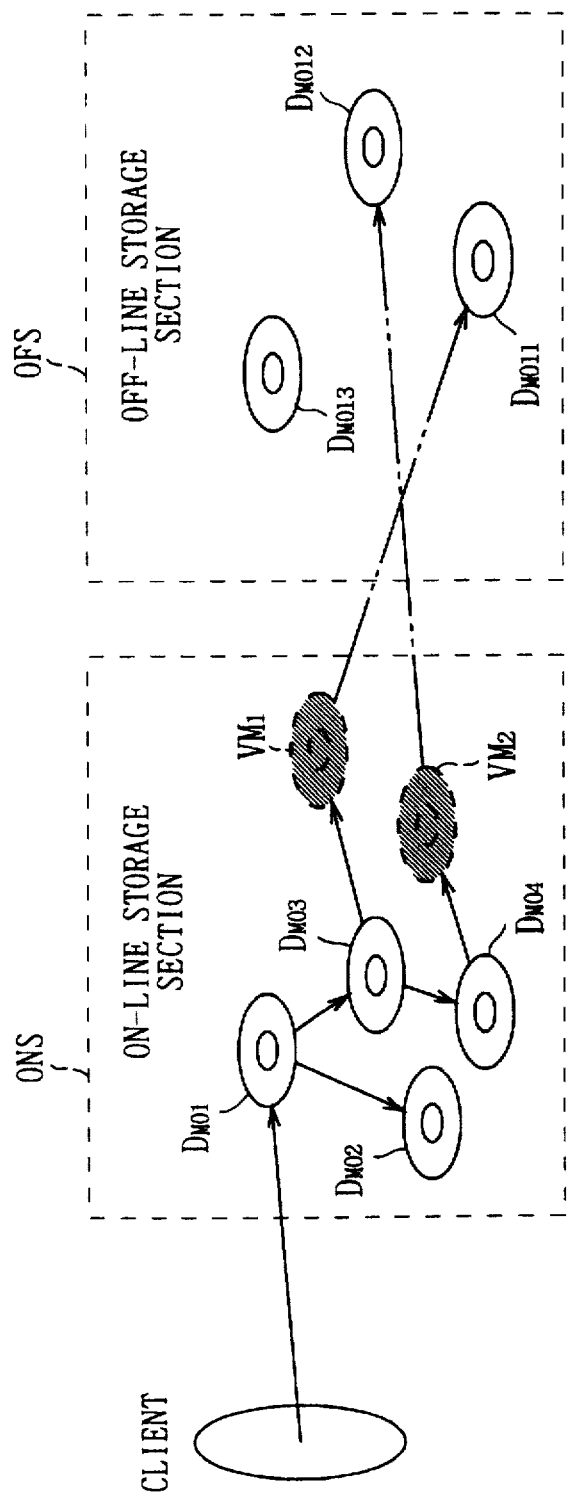
FIG. 6 is a linear diagram illustrating the off-line file management in the data storage processing apparatus.

In the case of FIG. 5, the client file system CFS is constructed on the storage of client's computer, and a part of nodes of the server file system SFS is constructed on the removable media of the magneto-optical disc Dmo1–Dmo4 in the on-line storage section ONS (FIG. 6). And, for example, the node a of the server file system SFS is arranged on the magneto-optical disc Dmo1, and, in the same manner, nodes b and c are arranged on the magneto-optical disc Dmo2, the node f is arranged on the magneto-optical disc Dmo3 and the node d is arranged on the magneto-optical disc Dmo4.

Moreover, the off-line file system OFFS1 to be connected to the node f of the server file system SFS through the node j is constructed on the magneto-optical disc Dmo12 in the off-line storage OFS area. And, in the same manner, the off-line file system OFFS2 to be connected to node d of the server file system SFS through node k is constructed on the magneto-optical disc Dmo11 in the off-line storage OFS area.

In addition to the above construction, two virtual storage media VM1 and VM2 is introduced to the on-line storage ONS. On the on-line storage ONS, the first virtual storage media VM1 offers a method to connect the magneto-optical disc Dmo3 on which the node f of the server file system SFS is arranged and the external magneto-optical disc Dmo11 on which the node j of the off-line file system OFFS1 is arranged.

Moreover, the second virtual storage media VM2 offers a method on the on-line storage section ONS to connect the magneto-optical disc Dmo4 on which node d of the server file system SFS is arranged and the outside magnetic memory Dmo12 on which node k of the off-line file system OFFS1 is arranged.

These virtual storage media VM1 and VM2 do not really exist on the on-line storage ONS as the magneto-optical disc but are arranged in the storage media on the on-line storage ONS, such as the corresponding area in the working set of the hard disc memory 3, and controlled by the storage managers SGN (FIG. 4) arranged in the corresponding gardens GDNk (k=1–K) respectively.

The directory information (having no file substance) of the off-line file system OFFS1 constructed on the magneto-optical disc Dmo11 of the off-line storage section OFS to be connected to the node f on the magneto-optical disc Dmo3 of the on-line storage section ONS is stored as the content of the virtual storage of media VM1. In a similar manner, the directory information (having no file substance) of the off-line file system OFFS2 constructed on the magneto-optical disc Dmo12 of the off-line storage section OFS to be connected to the node d on the magneto-optical disc Dmo4 of the on-line storage section ONS is stored in the virtual storage media VM2.

Accordingly, since the directory information of the file system constructed on media of the off-line storage section OFS is to be managed as virtual storage media on the on-line storage section ONS, file system space can be extended to off-line space from on-line space. Thus, the server file system SFS on the on-line space and the off-line file system OFFS1 and OFFS2 on the off-line space can be treated logically like the file system existing on the on-line storage as a whole. Accordingly, users using this data storage processing apparatus 1 can handle the off-line file existing on the off-line storage section OFS as if they were the off-line file existing on the on-line storage section ONS.

Next, the management regarding the storage media on the on-line storage section ONS wherein the server file system SFS is arranged and the off-line storage media on the off-line storage section OFS is described below including the client's operation (the client in client/server model).

Figure 7:
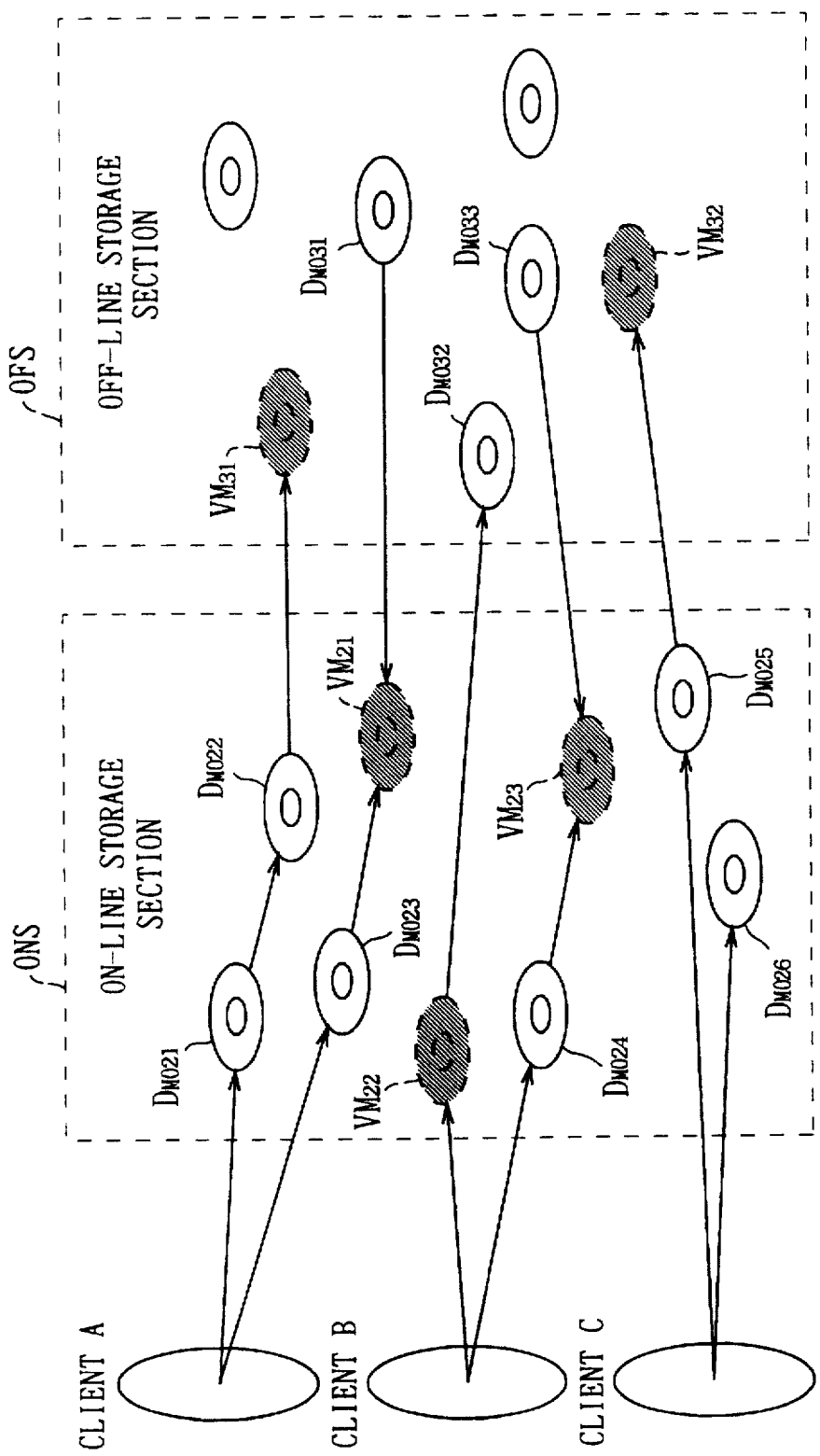
FIG. 7 is a linear diagram illustrating the on-line and off-line storage media management in the data storage processing apparatus.

In FIG. 7, client A, client B and client C have magneto-optical discs Dmo21, Dmo22, Dmo23, and Dmo24, and Dmo25, Dmo26, respectively, as storage media of the on-line storage section ONS wherein client file systems CFS are arranged as shown in FIG. 5 similar to that of the client of FIG. 6.

Also, clients A and B have the externally stored magneto-optical discs Dmo31, and Dmo32, Dmo33, respectively, as storage media of the off-line storage section OFS wherein off-line file systems OFFS1 and OFFS2 of FIG. 5 are arranged similar to that of the magneto-optical disc Dmo11 and Dmo12 of FIG. 6.

Under such conditions, in the on-line storage section ONS, regarding the client B, the virtual storage media VM22 remaining as a result of pulling out the magneto-optical disc Dmo32 in the direction from the on-line storage section ONS to the off-line storage section OFS exists as the information showing pulling-out operation of storage media in the direction to the off-line storage section OFS, and regarding clients A and B, virtual storage media VM21 and VM23 exist which are placed in order to insert the magneto-optical disc Dmo31 and Dmo33 in future in the direction from the off-line storage section OFS to the on-line storage section ONS.

Moreover, in the off-line storage section OFFS, regarding clients A and C, virtual media VM31 and VM32 exist which are placed in order to pull out the magneto-optical disc Dmo22 and Dmo25 in the direction from the on-line storage section ONS to the off-line storage section OFFS in the future.

In practice, at the time when the client A operates to output the magneto-optical disc Dmo22 as the on-line storage media to the off-line by pulling it out to the outside, as described above in FIG. 4, the storage manager SGM of the garden GDNk (k=1–K) presently possessed by the client A pulls out the directory information of the server file system SFS arranged on the on-line magneto-optical disc Dmo22 and writes in, for example the file name as the storage media information (media label) written on the magneto-optical disc Dmo22 as well as the directory information on the virtual storage media newly formed in the on-line storage section ONS in place of the magneto-optical disc Dmo22.

In addition to the above, connection information between the node f (FIG. 5) arranged in the magneto-optical disc Dmo21 as the on-line storage media and the node j (FIG. 5) arranged in the on-line magneto-optical disc Dmo22 is written in the virtual storage media formed in the on-line storage section ONS. Then, the on-line magneto-optical disc Dmo22 is removed from the on-line storage section ONS by the client A and is managed by the client A as the off-line storage media of the off-line storage OFS shown as the virtual storage media $VM_{31}$. Regarding the client B, the same condition as those of the relation described above between the virtual storage media VM22 of the on-line storage section ONS and the magneto-optical disc Dmo32 of the off-line storage section OFS is applied.

As a result, as well as by holding and managing the logical connection relation between the server file system SFS arranged on the on-line storage media and the off-line file system LFFS1 and OFFS2 arranged on the off-line storage media, the correlation among the on-line media f, the virtual storage media, and the off-line storage media is managed on the on-line, the on-line storage media and the off-line storage media in the exhausting direction from on-line to off-line can be managed.

Furthermore, at the time when the client B accesses the file written in the directory information of the virtual storage media VM23, the storage manager SGM of the garden GDNk which is presently owned by the client B investigates correlation information of the storage media written in the virtual media VM23. Thus, the magneto-optical disc Dmo33 as the off-line storage media in which the file substance is stored can be recognized and can also assign the client B to make the off-line storage media Dmo33 to the on-line storage media of the on-line storage section ONS based on the media information (electronic label) written in the virtual storage media VM23.

At the time when the client B transfers the off-line storage media Dmo33 to the on-line storage media condition, the virtual storage media VM23 is replaced by the storage media Dmo33 substance, and off-line file system OFFS1 and OFFS2 arranged in the storage media Dmo33 exists as a part of the server file system SFS arranged on the on-line storage ONS. Thus, the on-line storage media and off-line storage media management in the direction of storage media insertion from off-line to on-line can be executed.

(4) Automatic Labeling Mechanism

Figure 8:
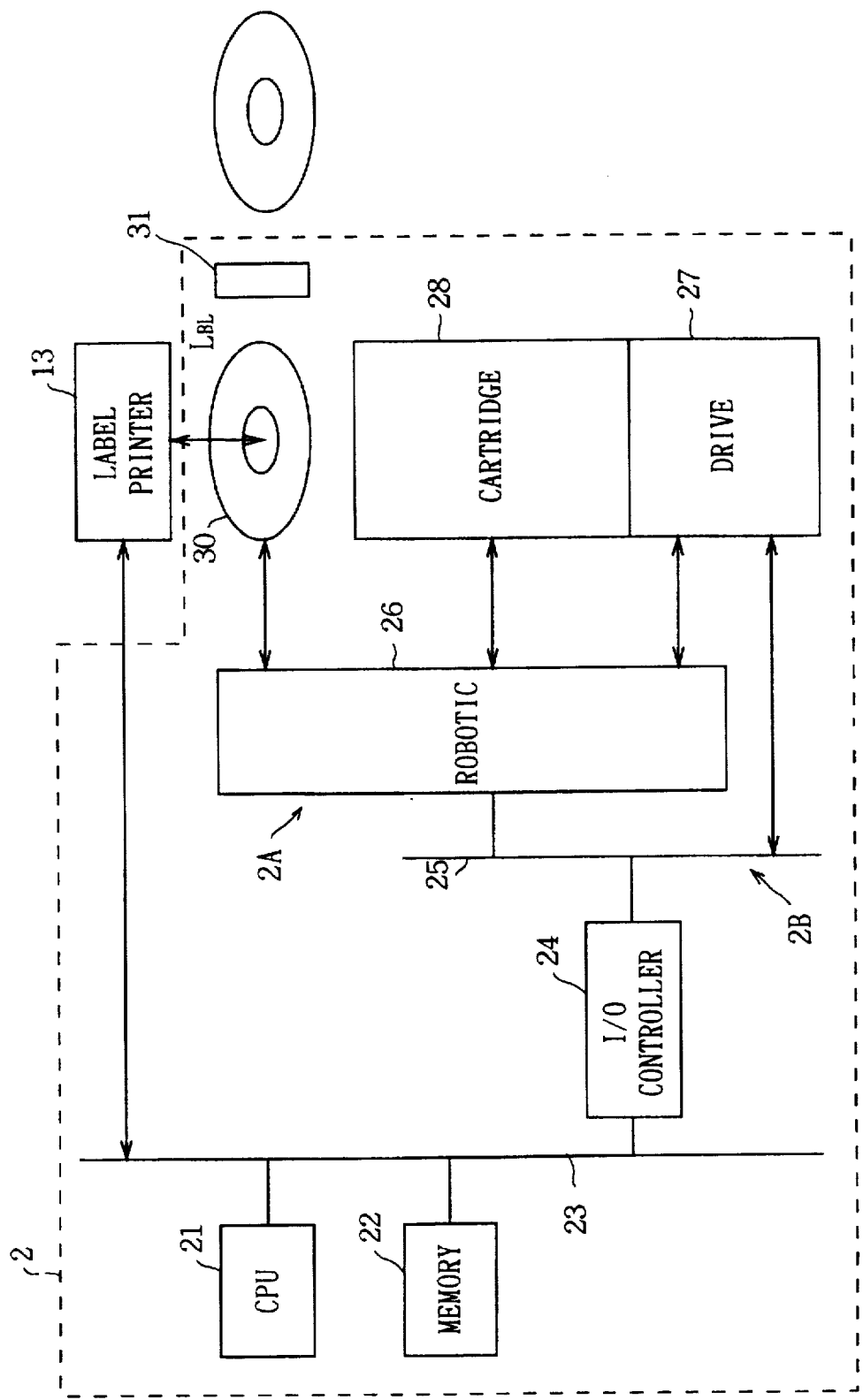
FIG. 8 is a block diagram showing the automatic labeling system in the data storage processing apparatus.

In the case of this embodiment, as shown in FIG. 8, a label printer 13 forms an automatic labeling mechanism with the loading/unloading device 2A of the auto changer 2.

The auto changer 2, by drive controlling the robotic 26 and the magneto-optical recording/reproducing drive 27 via an internal bus 23, an I/O controller 24 and a bus 25 according to the software module arranged in a memory 22 by the central processing unit (CPU) 21, constructs the magneto-optical disc memory 2B which writes or reads substantial information by the robotic 26 and the magneto-optical recording/reproducing drive 27 by assigning a plurality of magneto-optical discs removably stored in the cartridge 28, and stores or pulls out the magneto-optical disc 30 inserted by the client to the media inlet/outlet 31 in the cartridge 28 by controlling the robotic 26.

In FIG. 8 each manager's software module described above in FIG. 4 is arranged in the memory 22 and executed by the CPU 21. Also, the server file system SFS of FIG. 5 is stored in the magneto-optical disc as removable storage media in the cartridge 28. The function of the software module and the hardware at the time when the client accesses to the file system described above in FIG. 5 is hereinafter described exemplifying the working set of resources owned by the garden GDN, and the server file system SFS which is constructed on the working set of resources and off-line file system OFFS1, OFFS2 arranged on the off-line storage media.

If an access request for node f (FIG. 5) of the server file system SFS comes from the client, the garden manager GDM finds the file requested by the client from the system management information of the file system which the garden manager holds and manages, and delivers the file management information to the storage manager SGM (FIG. 4).

The storage manager SGM reads the slot number of the cartridge 28 allocated to the magneto-optical disc in which said file exists from the file management information and calls out the corresponding media manager MDM. The media manager MDM called out controls to the robotic 26 via the I/O controller 24 and bus 25 based on the storage information on the file storage media, and by transferring the corresponding storage media stored in the cartridge 28 to the drive 27, accesses the node f requested by the client.

With this arrangement, the magneto-optical disc memory 2B terminates the access function according to the access request from the client.

Then, if the access request of the node k (FIG. 5) in the off-line file system OFFS2 comes from the client, the garden manager GDM finds the file requested by the client from the management information of the file system held and managed by the garden manager and delivers the file management information to the storage manager SGM. The storage manager SGM recognizes that the file is arranged on the off-line media from the file management information. As described above in FIG. 7, these are executed by checking the information on the virtual media stored in the memory 22 by the storage manager SGM.

If the off-line storage media in which access requested node k is arranged is the magneto-optical disc Dmo31 of FIG. 7, the storage manager SGM delivers the media information (electronic label) on the virtual storage media (VM21) to the garden manager GDM. The garden manager GDM informs the storage media information of the electronic label to the client. The client finds out the magneto-optical disc Dmo31 as corresponding off-line storage media from the off-line storage OFS based on the storage media information and inserts from the media inlet-outlet 31 in order to replace it by the virtual storage media VM21 of on-line storage section ONS.

Thus, the garden manager GDM updates the management information of the magneto-optical disc Dmo31 managed as the virtual storage media as the on-line storage ONS media having substance. The storage manager SGM calls out the media manager MDM in order to move the inserted magneto-optical disc Dmo31 to the vacant slot of the cartridge 28. The media manager MDM moves the inserted magneto-optical disc Dmo31 to assigned slot of the cartridge 28. Afterwards, the node k is accessed in the same procedures as those of the node f described above.

In practice, the label printer is a dot impact printer and is installed inside of the auto changer 2, and by connecting this to the internal bus 23 via internal wiring, the label printer 13 can be controlled from the CPU 21 of the auto changer 2.

With this arrangement, labels which can be read easily and is distinguishable by the user can be automatically posted or printed on the surface of the magneto-optical disc as newly used removable media by the program control. By writing the electronic labels as the media information of removable storage media and simultaneously posting labels on the surface of media as visual information, clients can easily execute the off-line storage media management and the migration of the off-line storage media to the on-line storage media can be easily and certainly performed.

(5) Automatic Adjustment Processing of On-Line and Off-Line Capacity

Figure 9:
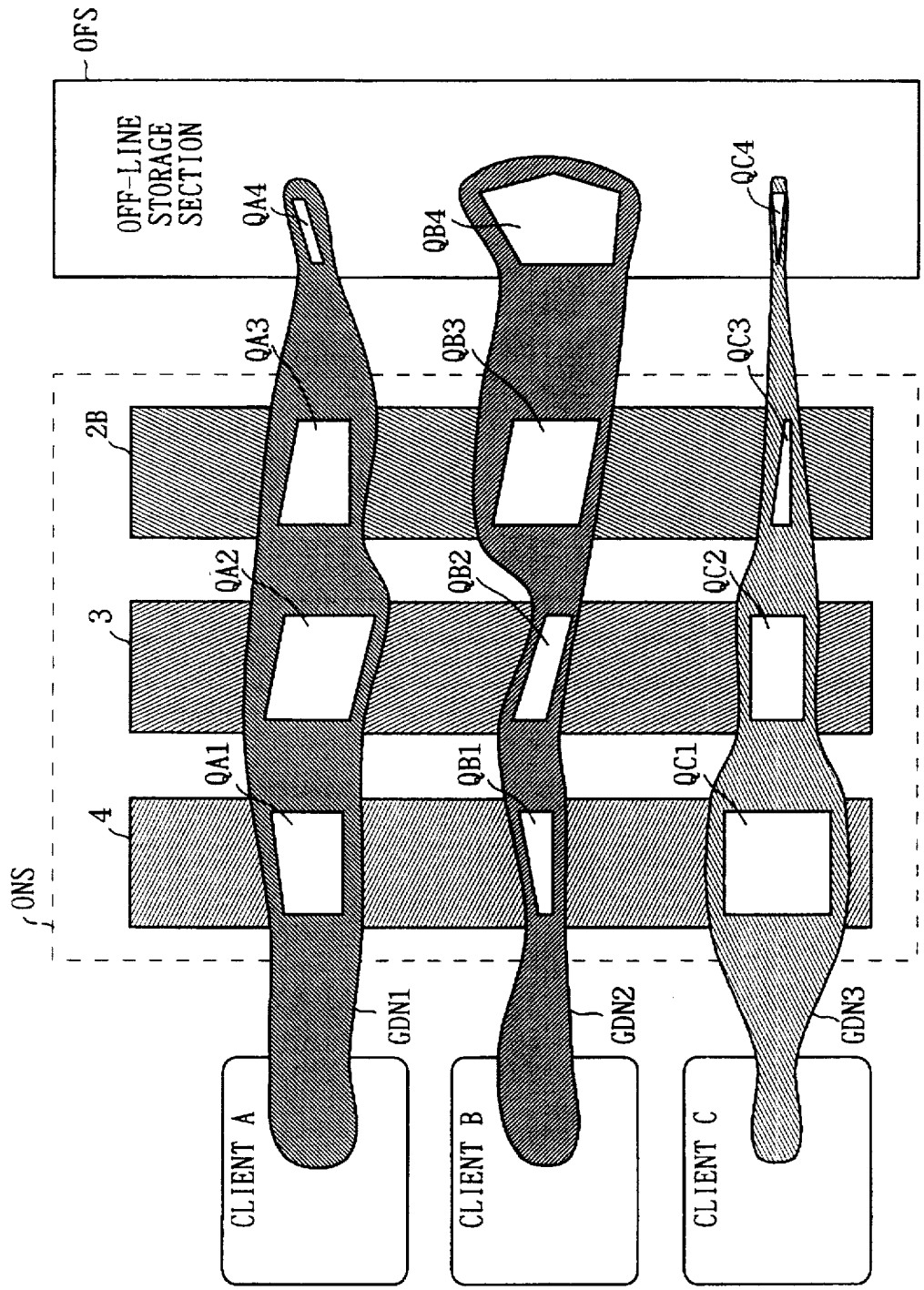
FIG. 9 is a linear diagram illustrating the automatic adjustment of the on-line capacity in the data storage processing apparatus.

In FIG. 9, the working sets of resources to be managed by the garden GDN1 are allocated to the client A, and the storage capacity possessed by the garden GDN1 for the semiconductor memory 4, hard disc memory 3 and magneto-optical disc memory 2B which compose the storage resources of the on-line storage section ONS, and magneto-optical disc of the external storage comprising the off-line storage section OFS can be expressed as the value corresponding to the intersecting areas of belt-shaped area which shows the garden GDN1 and belt-shaped areas showing the semiconductor memory 4, the hard disc memory 3 and the magneto-optical disc memory 2B and the storage area of the external storage.

In FIG. 9, the storage capacity of the memory 4, the hard disc memory 3 and the magneto-optical disc memory 2B and the external storage of the garden GDN1, GDN2 and GDN3 is expressed by the volume of capacity displays (QA1, QA2 and QA3, and QA4), (QB1, QB2 and QB3, and QB4) and (QC1, QC2 and QC3, and QC4) respectively.

For example, in regards to the semiconductor memory 4, the ratio of the areas of capacity displays QA1, QB1, QC1 of each garden GDN1, GDN2 and GDN3 respectively are different. This means that capacities of the semiconductor memory 4 allocated to each garden GDN1, GDN2 and GDN3 as the working set of resources are not equal. The same applies to the division of storage resources of the hard disc memory 3 and the magneto-optical disc memory 2B.

As described above, each garden GDN1, GDN2, GDN3 hierarchically arranges storages of the semiconductor memory 4, the hard disc memory 3 and the magneto-optical disc memory 2B in its own resources working set depending upon access time and storage capacity, and constructs the server file system described above in FIG. 5 on each hierarchical storage resource (QA1, QA2, QA3), (QB1, QB2, QB3), (QC1, QC2, QC3). Also, off-line file systems OFFS1, OFFS2 described above in FIG. 5 is constructed on the hierarchical storage resources (QA4, QB4, QC4) in the off-line storage section OFS.

The hierarchization of storages and the construction of file systems is executed by the software module composed of the garden manager GDM, the storage manager SGM and the media manager MDM possessed by each garden GDN1, GDN2, GDN3. Furthermore, each software module of the garden manager GDM, the storage manager SGM, the media manager MDM of each garden GDN1, GDN2, GDN3 changes the on-line storage capacities of hierarchical storage resources (QA1, QA2, QA3), (QB1, QB2, QB3), (QC1, QC2, QC3) in time series. This is done on the basis of the access frequency of files and the file size in the server file system SFS by each client.

Thus, by dynamically changing (as the time elapses) the capacities of storage resources QA1, QB1 and QC1 of the semiconductor memory 4, capacities of storage resources QA2, QB2 and QC2 of the hard disc memory 3 and capacities of storage resources QA3, QB3 and QC3 of the magneto-optical disc, which are working sets of resources possessed by each garden GDN1, GDN2 and GDN3 respectively according to the access characteristics of clients' files held by each garden GDN1, GDN2 and GDN3. Thus, resources can be allocated to each client fairly and efficiently.

Furthermore, in the present data storage processing apparatus 1, by automatically adjusting the on-line storage capacity, resources can be fairly and efficiently allocated to each client. In addition, by applying the on-line and off-line media management as described above in FIG. 7, the on-line storage capacity itself can be dynamically increased. Here, the server file system SFS is arranged on the on-line storage media, i.e., magneto-optical discs Dmo21–Dmo26, in the on-line storage section ONS of FIG. 7.

Moreover, the off-line file systems OFFS1, OFFS2 are arranged on the off-line storage media i.e., magneto-optical disc Dmo31–Dmo33, in the off-line storage section OFS of FIG. 7. Accordingly, in FIG. 9, server file systems SFS are arranged on working sets QA3, QB3, QC3 of storage resources of the magneto-optical disc of the magneto-optical disc memory 2B as on-line storage media, and off-line file systems OF OFFS1, OFFS2 are arranged on working sets QA4, QB4, QC4 of storage resources of the magneto-optical disc as off-line storage media.

In the on-line and off-line media management described above, the client executed the function to output the on-line media to off-line, however, each software module of the garden manager GDM, the storage manager SGM and the media manager-MDM, possessed by each garden GDN1, GDN2 and GDN3, automatically selects files having low access frequency which are constructed on capacities QA3, QB3, QC3 of the magneto-optical disc memory 2B of the auto changer 2 and simultaneously makes them as candidates of off-line file systems OFFS1 and OFFS2.

Then, assigning the client to output the on-line storage media on which corresponding file are arranged (e.g. magneto-optical discs Dmo22 and Dmo25 of FIG. 7), a slot of the magneto-optical disc memory 2B is released. Thus, by automatically migrating the on-line media in which files having low access frequency to the off-line, capacity of the on-line storage can be dynamically increased.

According to the data storage processing apparatus 1 as described above, by expanding file system spaces to the off-line and making the on-line and off-line media manageable, the off-line files all of which cannot be stored in the on-line storage can be operated on the on-line by the client. Moreover, by extending the on-line and off-line management lead by the client, the on-line storage capacity can be dynamically increased.

In addition to the above, by holding the adjustability of file system spaces expanded to the off-line and executing self adjustment of the on-line storage capacity for each garden based on the on-line and off-line management, files capable of increasing storage capacity practically without limitation can be offered to each client having said garden GDN.

(6) Data Storage Processing Operation

According to the foregoing construction, the data storage processing apparatus 1 performs the data storage processing operation according to the processing procedure described below.

Figure 13:
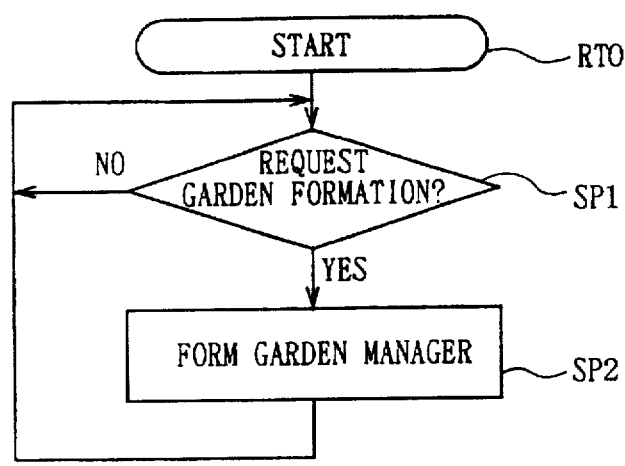
FIG. 13 is a flow chart showing the data storage processing procedure in the data storage processing apparatus.

First of all, CPU 5 of the data storage processing apparatus 1 starts the initialization in the main routine RTO of FIG. 13 and, at the step SP1, waits for the arrival of garden information request from any of the clients from the network 9 to the data storage processing apparatus 1. If an affirmative result is obtained at the step SP1, the CPU 5 forms the garden manager at the step SP2.

Figure 14:
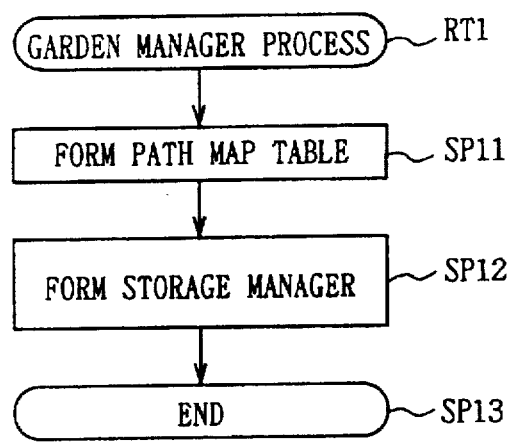
FIG. 14 is a flow chart showing the garden manager forming processing procedure of FIG. 13.

At this point, the garden manager executes the managing processing procedure shown in FIG. 14.

Figures 15, 26:
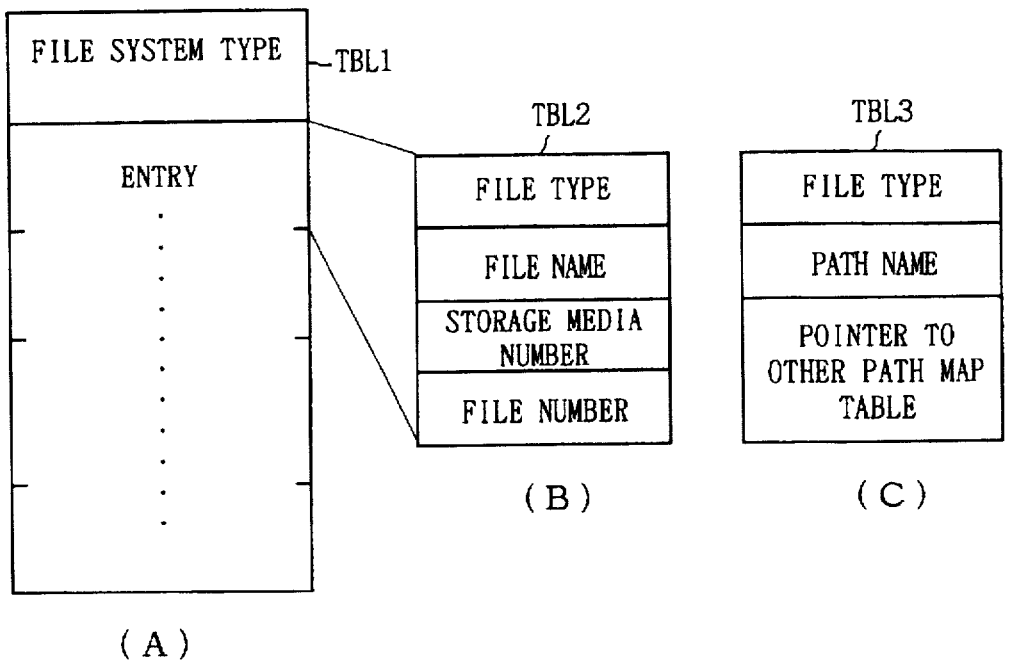
FIG. 15 is a linear diagram showing a path map table to be formed in FIG. 14.
FIG. 26 is a diagram showing the media access management table to be used in FIG. 19 and FIG. 25.

More specifically, after making up a path map table as shown in FIG. 15 at the step SP11 of FIG. 14, the garden manager forms the storage manager of FIG. 4 at the step SP12 and finishes the processing at step SP13.

Figure 10:
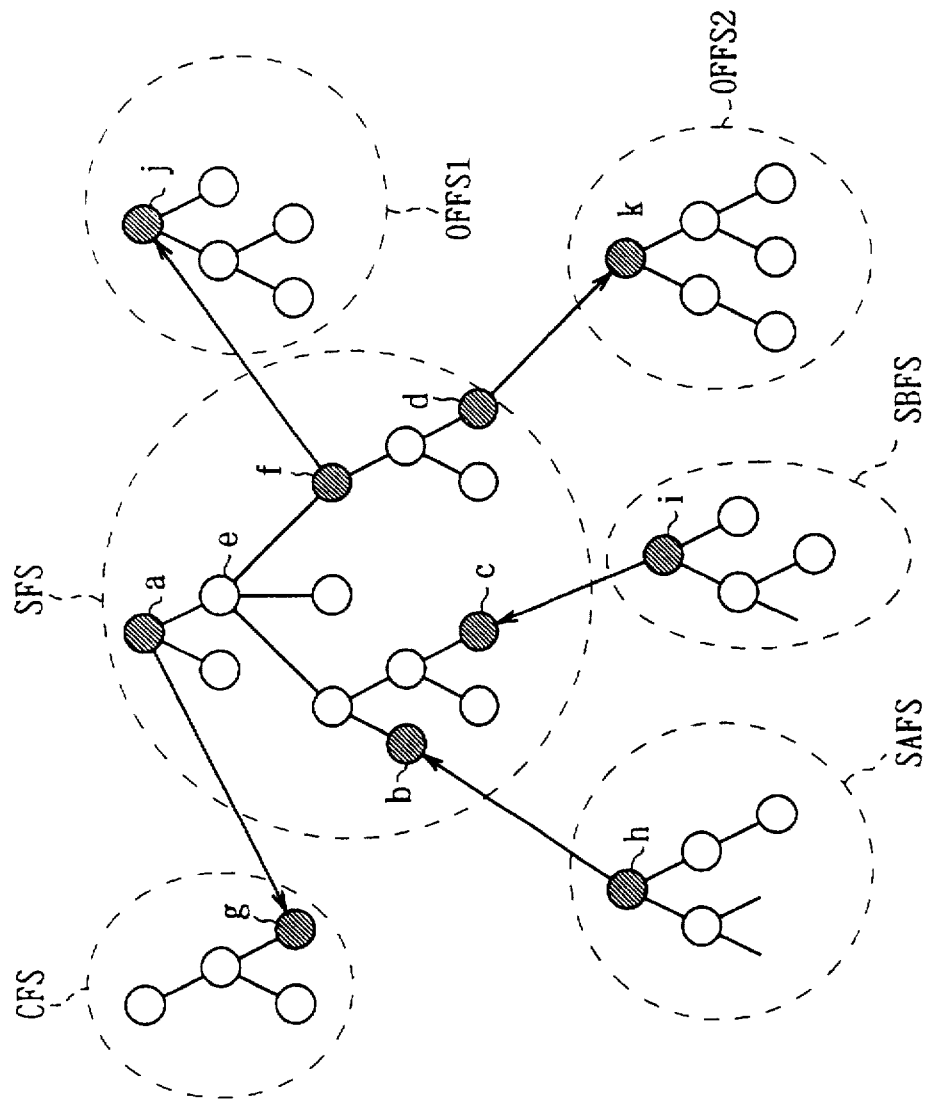
FIG. 10 is a linear diagram illustrating various multiple file systems in general according to the other embodiment of the present invention.

This path map table TBL1 is constructed for each file system and has information on each node including the server file system SFS, off-line file systems OFFS1 and OFFS2, and storage file systems SAFS and SBFS shown in FIG. 5 or FIG. 10, and is stored on the hard disc memory 3. As shown in FIG. 15(A), file system type is stored on this path map table TBL1 as the header for entry. As this file system type, there are garden file system concerning the present invention and other file system such as UNIX user file system, etc.

Each entry of the path map table TBL1 is constructed by multiple entry tables showing "ordinary file", "directory" or "mount point" as the file type, and in the case of entry table for file TBL2, "file" is stored as file type, while "file name", "storage media number" and "file number" are stored as the other information as shown in FIG. 15(B). On the other hand, in the case of entry table for directory or mount point TBL3, as shown in FIG. 15(C), "directory" or "mount point", is stored as file type, while "path name" and "pointer to other path map table" are stored as the other information.

Thus, in the case where the garden manager GDM of garden GDN1 or GDNk of FIG. 4 is formed, the CPU 5 forms the storage manager at the step SP12.

Figure 16:
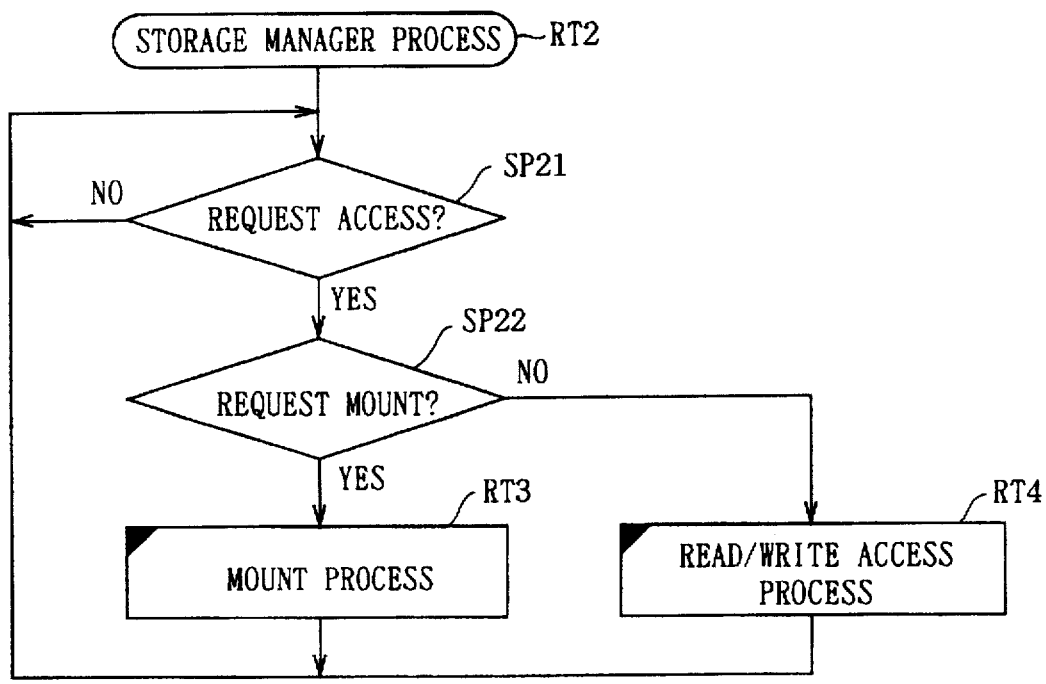
FIG. 16 is a flow chart showing the storage manager forming processing procedure of FIG. 14.

At this point, the storage manager enters the managing processing routine RT2 as shown in FIG. 16 and waits for the arrival of access request, and at the time when access request arrives, it judges whether or not the access request is the mount request at the step SP22.

Figure 17:
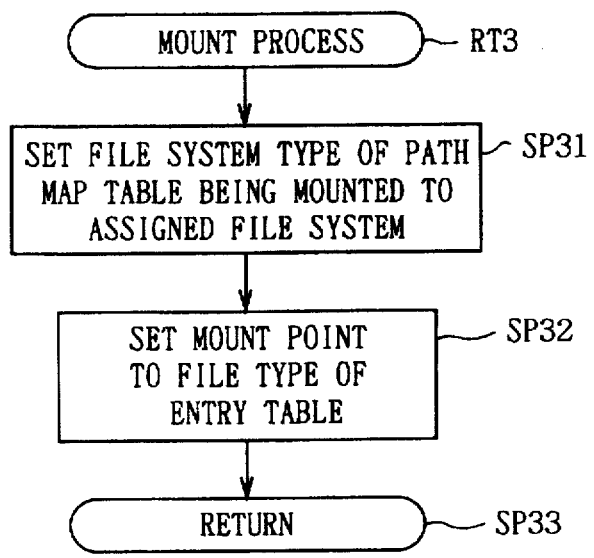
FIG. 17 is a flow chart showing the mount processing procedure of FIG. 16.

Then, if an affirmative result is obtained, this means that the mount processing to connect to the other file system is necessary for the node which is access requested, and, at this point, the CPU 5 proceeds to the mount processing subroutine RT3 and executes the mount processing procedure as shown in FIG. 17.

In the mount processing subroutine RT3, firstly the CPU 5 specifies the file system type of the path map table of the object to be mounted (e.g., nodes j, k of off-line file systems OFF1, OFF2) and sets in the file system at the step SP31. Then at next step SP32, the CPU 5 sets the mount point (TBL3) on the file type of the path map table (FIG. 15) and returns to the storage manager processing routine (FIG. 16) from step SP33.

On the other hand, if a negative result is obtained at step SP22, this means that the access request is not a mount processing but a read or write processing and CPU 5 proceeds to the read/write access processing subroutine RT4.

When the CPU 5 enters the read/write processing subroutine RT4, after researching the files (i.e., file system type (FIG. 15(A)) and file type on files or mount points (FIG. 15(B) or (C)) assigned by the client by the path map table (FIG. 15) at the step SP41, it executes the cache check subroutine RT5.

The cache check subroutine RT5 is the processing to check whether or not the file data to be stored in the magneto-optical disc memory 2B is read out in the hard disc memory 3 or not. Entering the cache check subroutine RT5, the CPU 5 judges whether or not the current access request is read access at step SP51. In the case of read access request, the CPU 5 judges whether or not the cache data management list has the queue at the step SP52.

Figure 20:
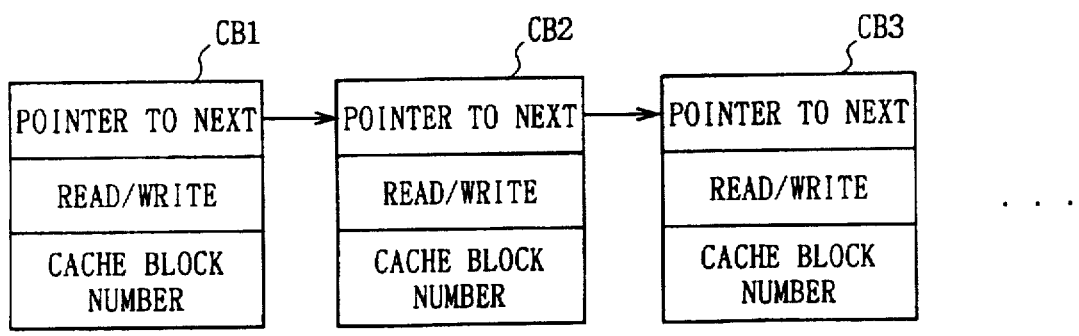
FIG. 20 is a linear diagram showing the cache data management list to be used in FIG. 19.

Here, the cache data management list is stored in the hard disc memory 3 and as shown in FIG. 20, has a plurality of cache blocks CB1, CB2 . . . the number of which corresponds to number of all slots of the magneto-optical disc memory 2B, and each cache block CBj (j=1, 2 . . . ) contains informations on read or write, cache block number and information to the next pointer. This cache data management list is managed by means of the LRU (least-recently-used) method, and the block most recently accessed is listed up to be connected at the head of queue, i.e., the leftmost side block CB1 in FIG. 20.

When an affirmative result is obtained at the step SP52, the CPU 5 proceeds to step SP53 and executes the queuing process on the head of the read cache management list regarding the discovered queue and reads out the file data of the queuing processed block and returns to the read/write access processing routine RT4 (FIG. 18) from step SP59.

On the other hand, if a negative result is obtained at step SP52, the CPU 5 proceeds to step SP55 and executes the cache mishit processing, and upon storing the cache mishit result in the internal memory 6, proceeds to the step SP54 and finishes the processing.

Furthermore, if a negative result is obtained at step SP51 described above, this means that the present access request is the write mode, and the CPU 5 proceeds to the step SP56 and writes the file data to be stored in the storage 7 in the hard disc memory 3 for a while and stores that the access request is write access request in the internal memory 6 and proceeds to step SP54 described above and finishes the processing.

With this arrangement, when the cache check processing is finished, the CPU 5 returns to the read/write access processing subroutine RT4 (FIG. 18) and judges whether or not the caching is finished at the step SP42.

At this point, if an affirmative result is obtained, the CPU returns to the storage managing processing routine (FIG. 16) from step SP43. On the other hand, if a negative result is obtained at step SP42, the CPU 5 proceeds to the step SP44 and judges whether the access request arrived at step SP21 (FIG. 16) is the file data to be managed by the garden file system (GFS) referring to file system type of the path map table (FIG. 15), and, if an affirmative result is obtained, enters the garden file system processing routine RT6.

Figure 21:
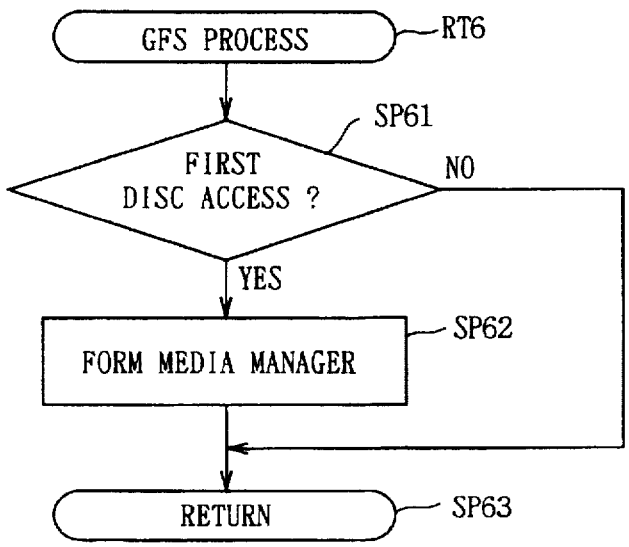
FIG. 21 is a flow chart showing the garden file system (GFS) processing procedure of FIG. 18.
Figure 19:
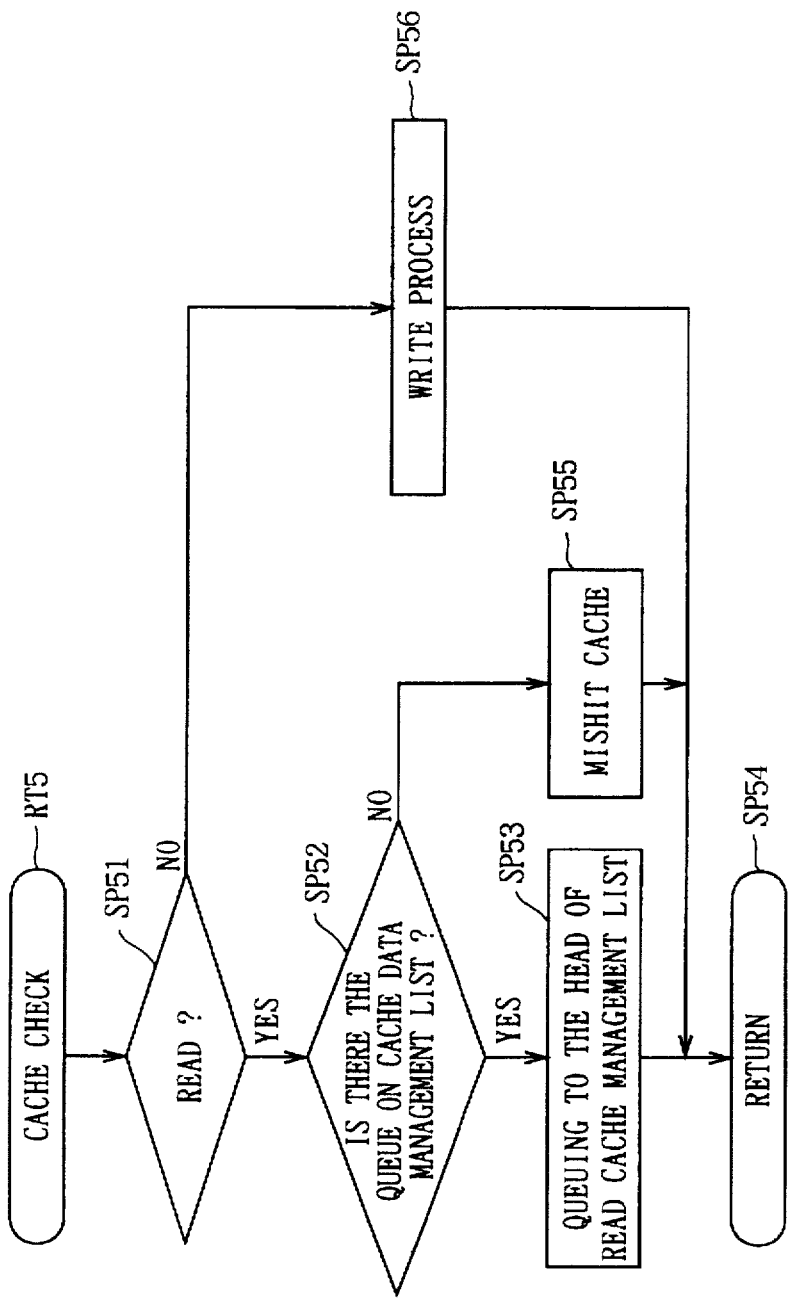
FIG. 19 is a flow chart showing the cache check processing procedure of FIG. 18.

On entering the garden file system processing routine RT6, the CPU 5 judges whether the disc is accessed for the first time or not at step SP61 as shown in FIG. 21, and, if an affirmative result is obtained, the CPU 5 forms the media manager of FIG. 4 at the step SP62 and returns to the read/write access processing routine RT4 (FIG. 18) from step SP63.

Figure 22:
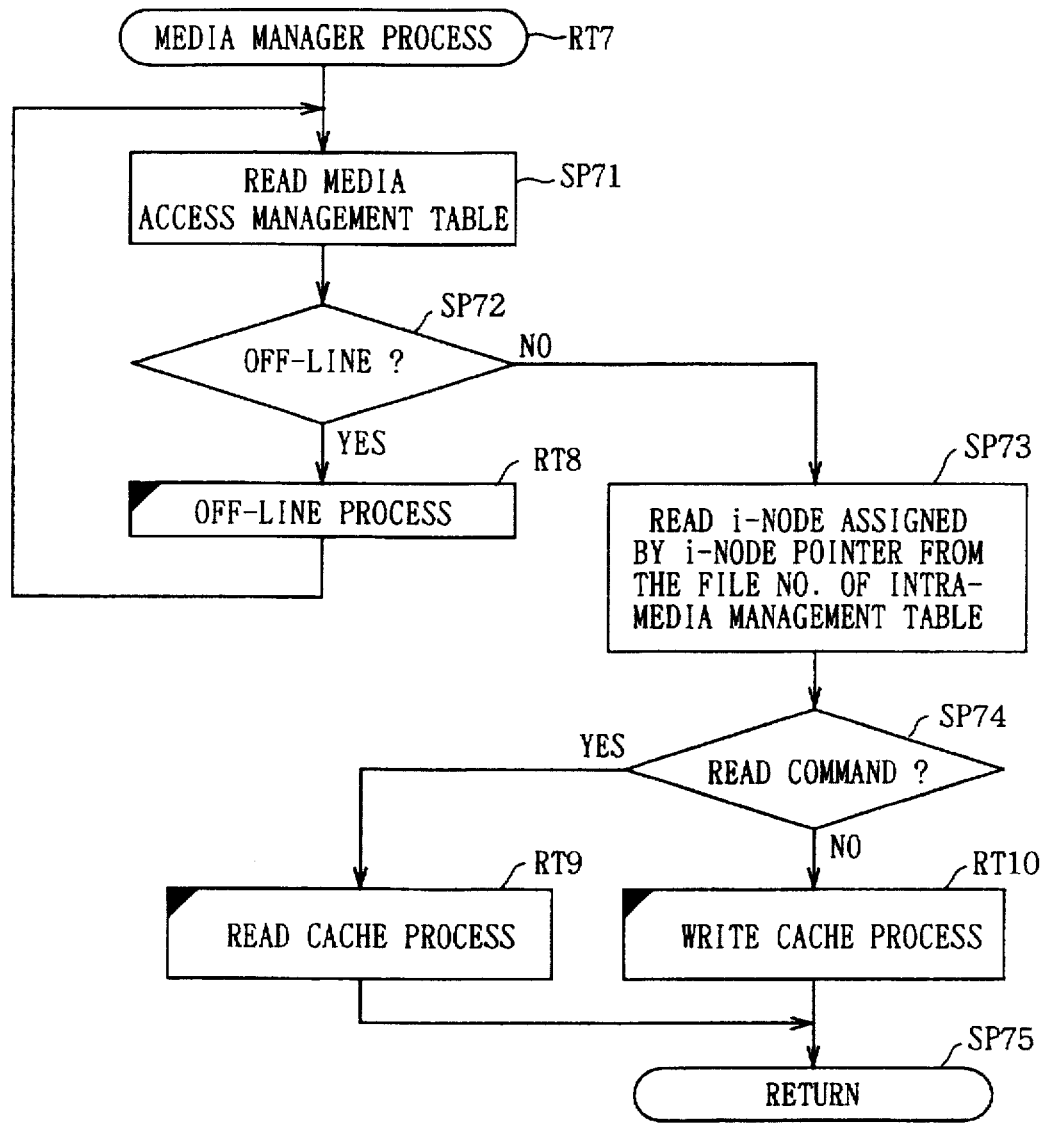
FIG. 22 is a flow chart showing the media manager forming processing procedure of FIG. 21.

At this point, after executing the reading processing of the media access management table (FIG. 26) at step SP71 as shown in FIG. 22, the CPU 5 judges that the media manager is off-line or not at the step SP72, and, if an affirmative result is obtained, the CPU 5 returns to step SP71 described above after processing the off-line processing subroutine RT8.

Here, the CPU 5 judges whether, in the media numbers stored in the media access management table TBL31, the media number which coincides with the media number of the magneto-optical disc on which the file to be accessed is stored exists. In this connection, the media number of the magneto-optical disc on which the file to be accessed is stored can be found from the storage media number in the file type storage information of the path map table TBL1.

Figure 23:
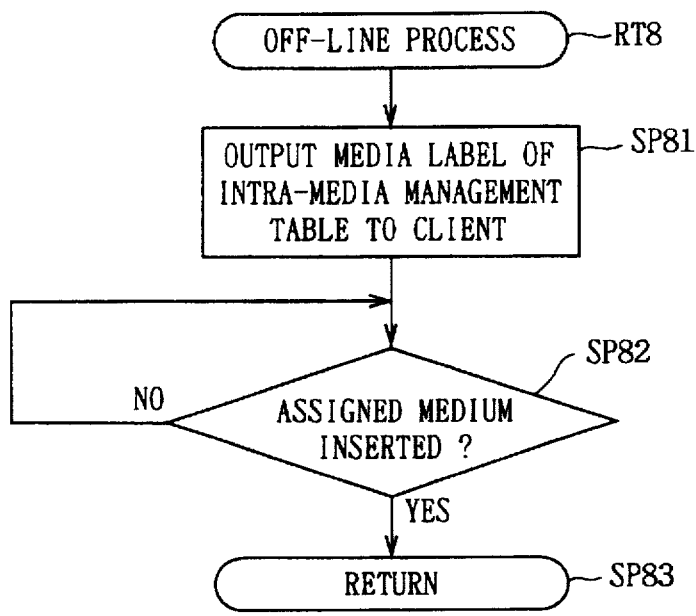
FIG. 23 is a flow chart showing the off-line processing procedure of FIG. 22.
Figure 24:
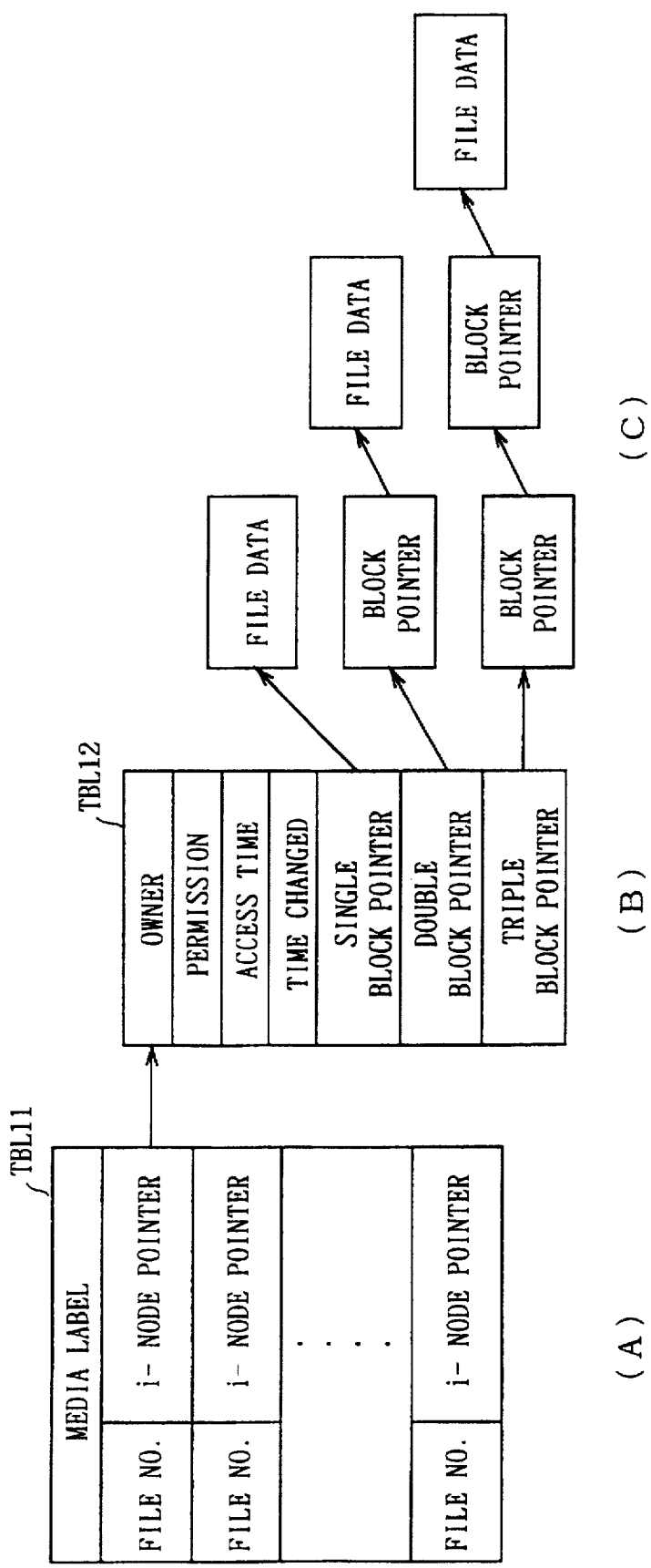
FIG. 24 is a linear diagram showing the intra-media management table of FIG. 23.
Figure 25:
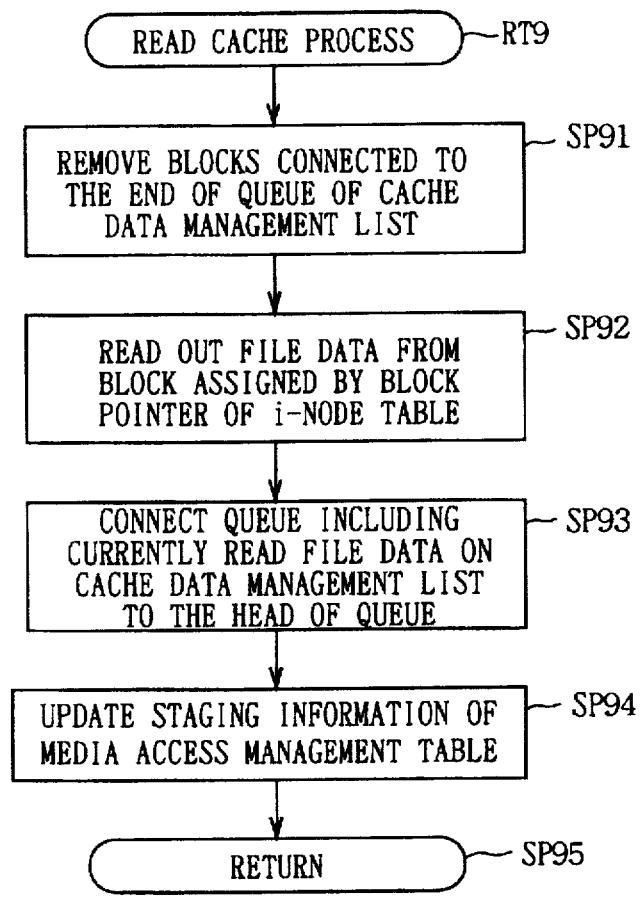
FIG. 25 is a flow chart showing the read cache processing procedure of FIG. 22.

Moreover, when the CPU 5 enters the off-line processing subroutine RT8, it executes the processing to output the media label of the intra-media management table TBL11 (FIG. 24) to the client at step SP81 as shown in FIG. 23.

The intra-media management table TBL11 is installed in each storage media (i.e., magneto-optical disc 2B), and this table TBL11 contains the management information on "media label", "file number" and "node pointer" of files stored in the storage media as shown in FIG. 24(A).

The node table TBL12 shown in FIG. 24(B) is stored on the position shown by the node pointer of each file number of the intra-media management table TBL11 of each storage media and, thus, informations on "owner", "permission", "access time", "time changed", "single block pointer" (contains data which is the file substance as shown in FIG. 24(C)), "double block pointer" (contains a block pointer and the corresponding file substance data as shown in FIG. 24(C)), and "triple pointer" (contains 2 block pointers information and file data as shown in FIG. 24(C)) are stored.

Then, the CPU 5, upon outputting the media label at step SP81 (FIG. 23), waits for the user to insert the designated medium to the loading/unloading device 2A of the auto changer 2 at the next step SP82, and, when the CPU 5 confirms that the insertion has been done, returns to step SP71 of the media manager processing routine RT7 (FIG. 22) via step SP83. Here, the user can distinguish the targeted storage medium by the labels posted on the media.

If a negative result is obtained at step SP72 of the media manager processing routine RT7 (FIG. 22), this means that file access requested is not off-line, but is on-line (the media is inserted in the slot), and, the CPU 5 proceeds to step SP73 and after reading in the i-node assigned by the i-node pointer from the file number of the intra-media management table (FIG. 24), judges whether the read command is necessary at the step SP74.

If an affirmative result is obtained at the step SP74, the CPU 5 executes the processing of read cache processing routine RT9.

When entering the read cache processing routine RT9, the CPU 5 executes the processing to remove the blocks connected to the last queue of the cache data management list on the plural number of blocks as needed at step SP91, and then, at the step SP92, the CPU 5 executes the processing to read out the file data from the block assigned by the block pointer of the i-node table (read ahead) and, at step SP93, the CPU 5 processes to connect the queue including the file data now read in the cache data management list to the head of queue, and then, at the following step SP94, after executing the update processing of the access count data and staging information of the media access management table TBL31 (FIG. 26), the CPU 5 returns to the media manager subroutine RT7 (FIG. 22) via step SP95.

Here, as shown in FIG. 26, the media access management table TBL31 stores "access count" (access history, i.e., it shows the number of access), "staging information" (e.g., information to show access time) and "media lock/unlock information" in every slot number as the whole storage, and, the CPU 5 executes the updating processing at step SP94 in utilizing the stating information and the access count information.

If a negative result is obtained at step SP74 of the media manager subroutine RT7 (FIG. 22), this means that the current request is not a read command but rather, a write command, and, at this moment, the CPU 5 executes the following write cache processing subroutine RT10.

Figure 27:
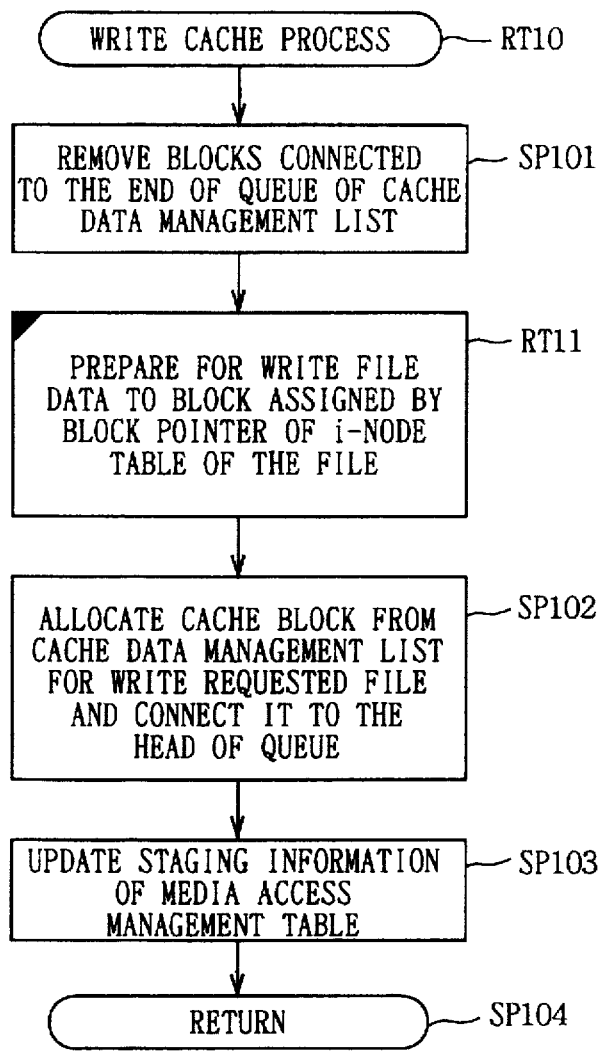
FIG. 27 is a flow chart showing the write cache processing procedure of FIG. 22.

When entering the write cache subroutine RT10, the CPU 5 executes the processing to remove the block (a plurality of blocks as necessary) connected to the last queue of the cache data management list (FIG. 20) as shown in FIG. 27, and, at the next write preparation routine RT11, the CPU 5 prepares for the writing process of file data to the block specified by the block pointer of the i-node table TBL12 (FIG. 24(B)) of the file.

Figure 28:
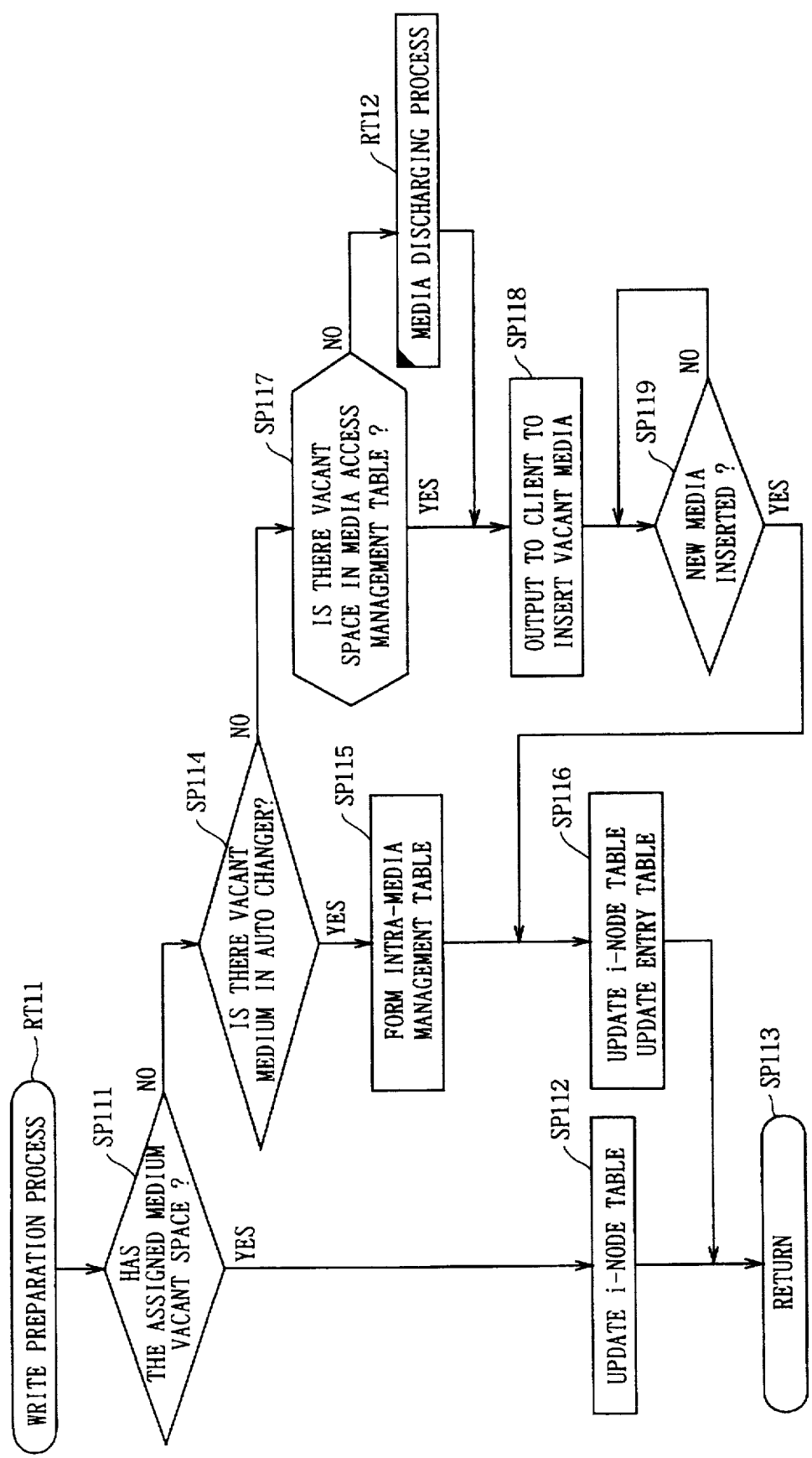
FIG. 28 is a flow chart showing the actual write processing procedure of FIG. 27.

When the CPU 5 enters this write preparation processing routine RT11, it judges whether vacant space exists in the media to be assigned at step SP111 as shown in FIG. 28.

This judgment is to confirm whether the file data to be written can be written in the magneto-optical disc because of the space remaining in the assigned media, i.e., the magneto-optical disc, and the degree of remaining space will be known using the data stored in every slot number as the remaining capacity data of the media access management table TBL31 (FIG. 26).

If an affirmative result is obtained at step SP111, meaning that there remains enough room for the file data to be written in the magneto-optical disc by the current access request without any omissions, the CPU 5 proceeds to step SP112 and updates the corresponding node table TBL12 in the intra-media management table (FIG. 24), and after updating the entry table TBL2 or TBL3 of the path map table TBL1, returns to the write cache processing routine RT10 (FIG. 27) at step SP113.

On the other hand, if a negative result is obtained at step SP111 meaning that there is no room for the information data to which access is requested in the assigned storage medium, i.e., the magneto-optical disc, the CPU 5 proceeds to step SP114 and judges if there exist any vacant media in the magneto-optical disc memory 2B in the auto changer.

At this step SP114, the CPU 5 executes the processing to search slots having large remaining capacity and to which the garden is not allocated, (the slot number which does not exist as the garden number).

If an affirmative result is obtained at step SP114, meaning that a vacant media is found in the auto changer 2, the CPU 5 proceeds to step SP115, and after executing the processing to tabulate the information on the storage media into a management table in the intra-media management table TBL11 (FIG. 24), updates the node table of the intra-media management table TBL11 (FIG. 24) at step SP116 and simultaneously, it updates the entry table TBL2 or TBL3 of the path map table TBL1, and thus, the CPU 5 finishes the preparation to write the information data to which access is requested for the vacant media in the auto changer 2.

Accordingly, at this point, the CPU 5 returns to the write cache processing routine RT10 (FIG. 27) via step SP113.

Furthermore, if a negative result is obtained at step SP114, this means that there is no vacant storage media in the auto changer 2, and at this point, the CPU 5 proceeds to step SP117 and judges whether there is room in the media access management table TBL31 or not.

The judgment at this step SP117 is to execute the processing to search whether there are any slot numbers on which no data is stored on the media number columns in the media access management table TBL31 (FIG. 26), and when an affirmative result is obtained, it means that there exist slots in which no storage media, i.e., no magneto-optical disc, is inserted are discovered, and, at this point, the CPU 5 proceeds to step SP118 and, after outputting the information to show that the vacant media, i.e. the magneto-optical disc on which no information is written is inserted to the slot of the slot number to the client via the network interface 8, the CPU 5 waits for a new magneto-optical disc to be inserted at step SP119.

Then, when an affirmative result is obtained at step SP119, the CPU 5 can confirm that the user inserted a new storage medium, and while updating the node table TBL12 of the intra-media management table TBL11 and updating the entry table TBL12 or TBL13 of the path map table TBL1 at step SP116, and returns to the write cache processing routine RT10 (FIG. 27) from step SP113.

On the other hand, if a negative result is obtained at step SP117, this means that there exists no vacant storage media in the auto changer, and at this point, by executing the media discharging processing routine RT12, the CPU 5 executes the media discharging processing to pull out some of the magneto-optical discs in the auto changer 2, and thus, the processing to make vacant slots in the auto changer 2 is performed. Then, the CPU 5 executes the processing to return to the write cache processing routine RT10 (FIG. 27) via steps SP118, SP119, SP116 and SP113.

On entering in the media discharging processing subroutine RT12, the CPU 5 selects the least frequently accessed storage medium (that is the least frequently used storage medium) from the media access count and the staging information in the media access management table TBL (FIG. 26) at step SP121 and then judges whether the storage medium is locked or not at step SP122.

At this point, if an affirmative result is obtained, this means that the least frequently accessed storage medium is locked up so that this medium cannot be changed to off-line freely, and at this moment, the CPU 5 returns to step SP121 described above, and after selecting the second least frequently accessed storage medium, executes the processing of step SP122 on the storage medium.

If a negative result is obtained at step SP122, this means that the selected storage media can be discharged, and at this moment, the CPU 5 proceeds to step SP123 and checks the cache data management list (FIG. 20), and after executing the file data flushing on the storage media, executes the discharge/print processing from the next step SP124.

At this point, if the read/write data of the cache block connected to the end of list is write, the CPU 5 executes the flush processing to write the file data of the cache block stored in the hard disc to the corresponding storage medium of the magneto-optical disc memory.

Figure 29:
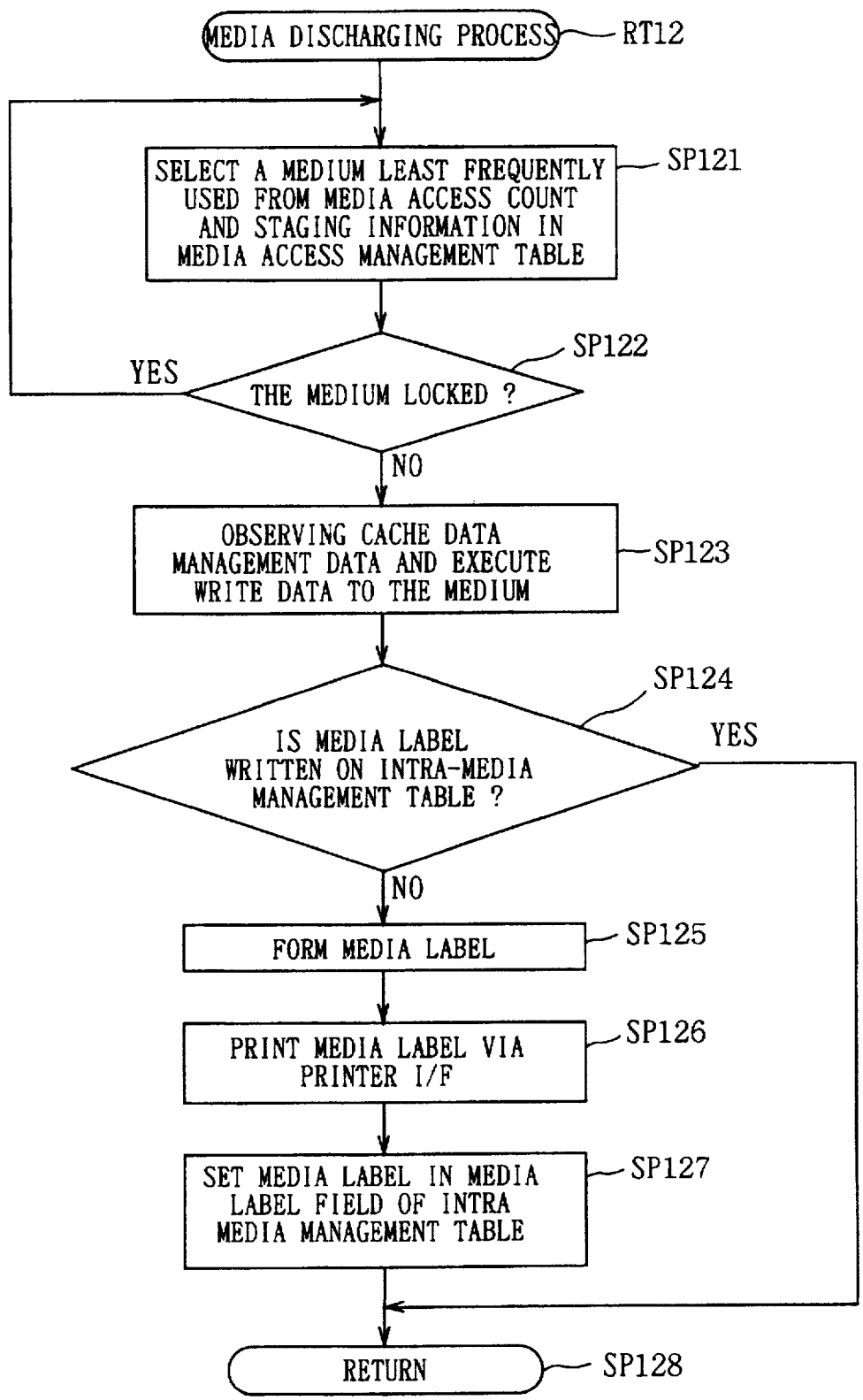
FIG. 29 is a flow chart showing the media discharging processing procedure of FIG. 28.

At step SP124, the CPU 5 judges whether the media label has already been written in the storage medium with the corresponding slot number in the intra-media management table TBL11 (FIG. 24) or not, and if a negative result is obtained, the CPU 5 forms media label at step SP125 and prints the media label at the label printer 13 (FIG. 2) through the printer I/F at step SP126. Thus, the client, by putting this label on the cartridge of the magneto-optical disc, can distinguish this magneto-optical disc from the other discs even though this magneto-optical disc changes to off-line. Then, the CPU 5 sets the media label on the media label field of the intra-media management table TBL11 (FIG. 24) at step SP127, and it finishes the media discharge processing subroutine RT12 (FIG. 29) via step SP128.

On the other hand, if an affirmative result is obtained at step SP124 described above, this means that the media label has already been written and the new setting is unnecessary, i.e., the label has already been pasted on the cartridge of the magneto-optical disc. At this point, the CPU 5 returns to the write preparation processing routine RT11 (FIG. 28) skipping over steps SP125-SP127.

With this arrangement the discharging preparation of and discharging the magneto-optical disc to the outside as well as the automatic labeling is executed. Then, the CPU 5 finishes the write preparation processing routine RT11 passing through steps SP118, SP119, SP116 and SP113 and returns to the write cache processing routine RT10 (FIG. 27). At step SP102, the CPU 5 allocates cache block from the cache data management list on the data to which write process is requested and connects this to the head of the queue. At the next step SP103, the CPU 5 updates the staging information of the media access management table TBL31 (FIG. 26) so as to finish the write cache processing subroutine RT10. And the CPU 5 returns to the media manager forming processing subroutine RT7 (FIG. 22) from step SP104 and finishes the garden file system (GFS) processing routine RT6 (FIG. 21) via step SP75. Thereby, the CPU 5 returns to the read/write access processing routine RT4.

On the other hand, when a negative result is obtained at step SP61 of the garden file system (GFS) processing routine RT6 (FIG. 21), the CPU 5 judges that access to the disc is not for the first time and returns to the read/write access processing routine RT4 (FIG. 18) from step SP63 skipping over the media manager forming step. Thereby, the CPU 5 returns to the storage manager processing routine RT2 (FIG. 16) from step SP43.

Figure 18:
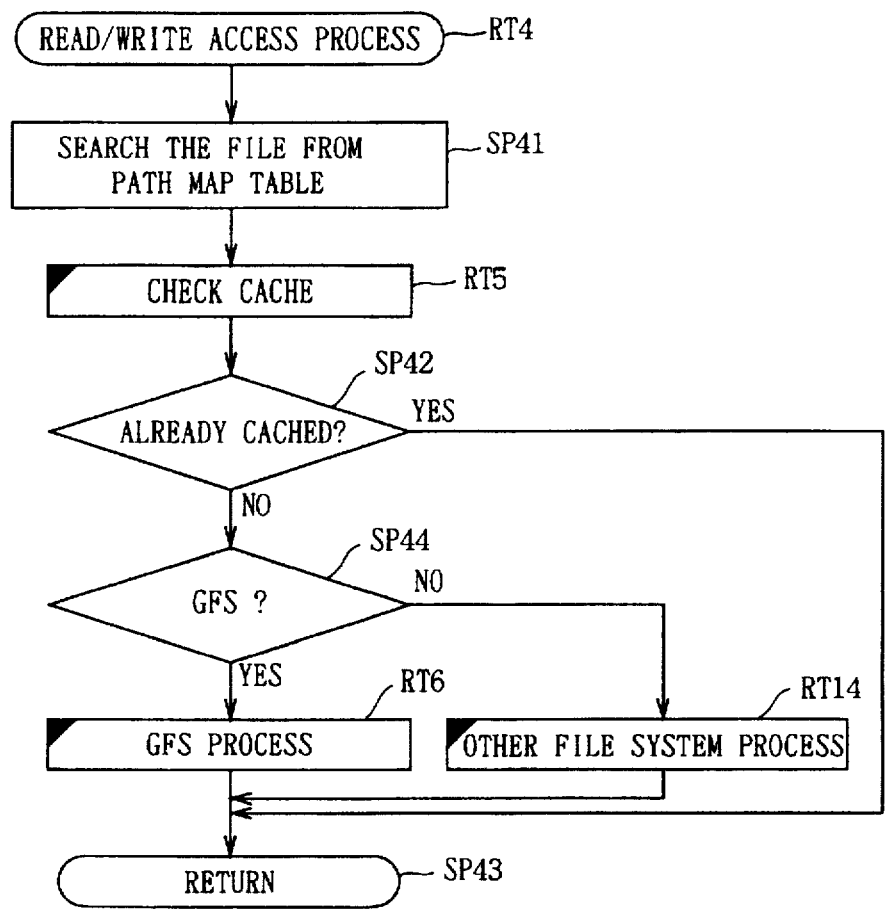
FIG. 18 is a flow chart showing the read/write access processing procedure of FIG. 16.

In the case described above, the operation of CPU 5 when the garden file system (GFS) is placed on the storage 7. However, in the case of placing other files on the storage 7 with the garden file system (GFS), a negative result can be obtained at step SP44 of the read/write access processing subroutine RT4 (FIG. 18). Thus, the CPU 5 judges that the file to which access is requested is the file in the file system other than the garden file system and then enters to the other file system processing subroutine RT14.

Figure 30:
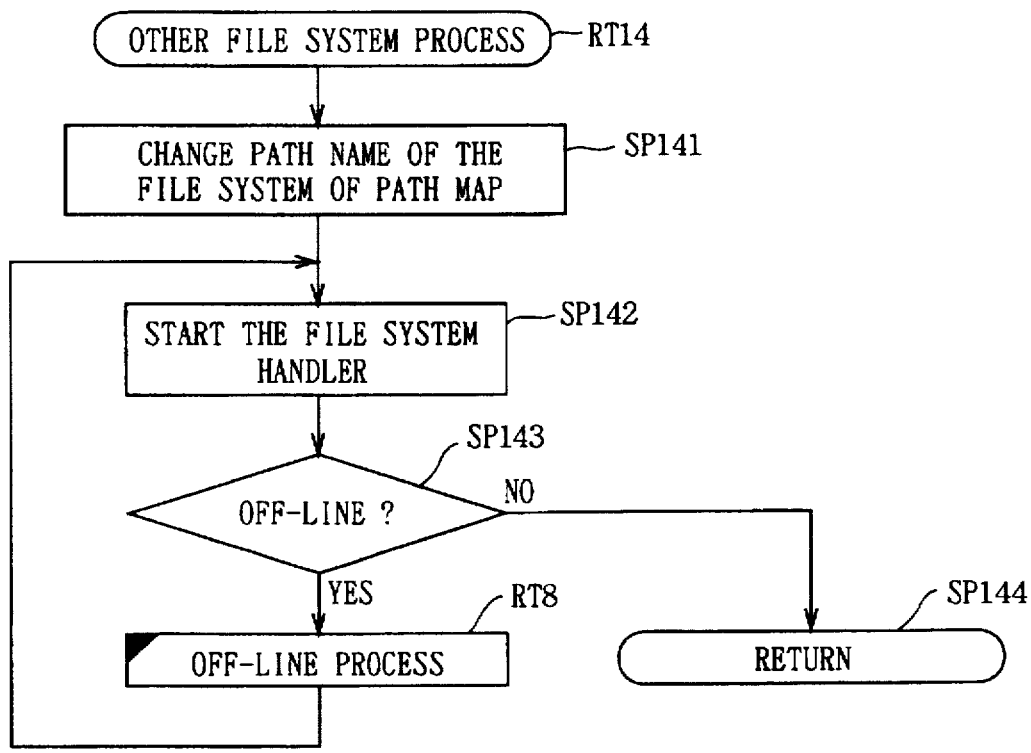
FIG. 30 is a flow chart showing the other file system processing procedure of FIG. 18.

Thus, on entering in the other file system processing subroutine RT14, the CPU 5 changes the path name of the file system of the garden file system (GFS) path map table TBL1 at step SP141 as shown in FIG. 30. Then, the CPU 5 starts the file system handler at step SP142, proceeds to step SP143 and judges whether the file to which access is requested is for the off-line or not on the basis of the media access management table TBL31.

At this point, if an affirmative result is obtained, this means that the off-line processing is necessary at the moment. Then, the CPU 5 enters the off-line processing subroutine RT8 and executes the off-line processing RT8 described above in FIG. 23, then returns to step SP142.

On the other hand, if a negative result is obtained at step SP143, this means that the on-line processing is necessary. Then, the CPU 5 returns to the read/write access processing subroutine RT4 (FIG. 18) from step SP144.

At this point, the CPU 5 finishes all processings of the read/write access processing subroutine RT4 and returns to the storage manager processing (FIG. 16) via step SP43. Then, the CPU 5 waits for arriving new access request at step SP21.

Accordingly, the CPU 5 can execute the operation described above in FIG. 1–FIG. 12 according to the processing procedure described above in FIG. 13–FIG. 30.

(7) Other Embodiments (7-1) FIG. 10 shows another embodiment according to the present invention. In this case, by mounting node h of the storage A file system SAFS constructed on the storage comprising the write once type optical disc memory to node b of the server file system SFS, the data storage processing apparatus 1 treats files in the storage A file system SAFS as a part of the server file system SFS.

Furthermore, by mounting node i of the storage B file system SBFS constructed on the storage comprising the optical disc memory to node c of the server file system SFS, files in the storage B file system SBFS can be treated as a part of the server file system SFS.

In the case of the data storage processing apparatus 1 constructed as in FIG. 10, since the file system constructed on the other storage, i.e., the storage comprising write once type disc memory, optical disc memory, in addition to the magneto-optical disc memory storage, can be mounted, the user can access the optional file systems constructed on various types of storages through the client file system CFS without being aware of the storage. More specifically, the storage manager SGM to be called by the garden manager GDM executes the mounting of the file system having the other file management structure including server file system SFS and client file system CFS to nodes b, c, d, f of the tree structure in the server file system SFS.

Since the storage manager SGM has the module which understands the file system structure to be mounted, various multiple file systems constructed on various multiple storages can be mounted in the server file system SFS, and also the file system mounted can be treated as an extension of the server file system SFS.

For example, the storage A file system SAFS is constructed on the storage like the write once type optical disc, and by mounting node h of the storage A file system SAFS to node b in the server file system SFS, files in the storage A file system SAFS can be treated as a part of the server file system SFS. In the same manner, by mounting node i of the storage B file system SBFS to node c in the server file system SFS, the storage B file system SBFS constructed on the storage like the optical disc can be treated as an extension of the server file system SFS.

Thus, according to the data storage processing apparatus 1, various multiple file systems constructed on various multiple storages can be mounted together, and moreover, the client can access files in various multiple file systems, such as the server file system SFS, storage A file system SAFS and storage B file system SBFS as extensions of the server file system SFS through the client file system CFS without being aware of storages.

Figure 11:
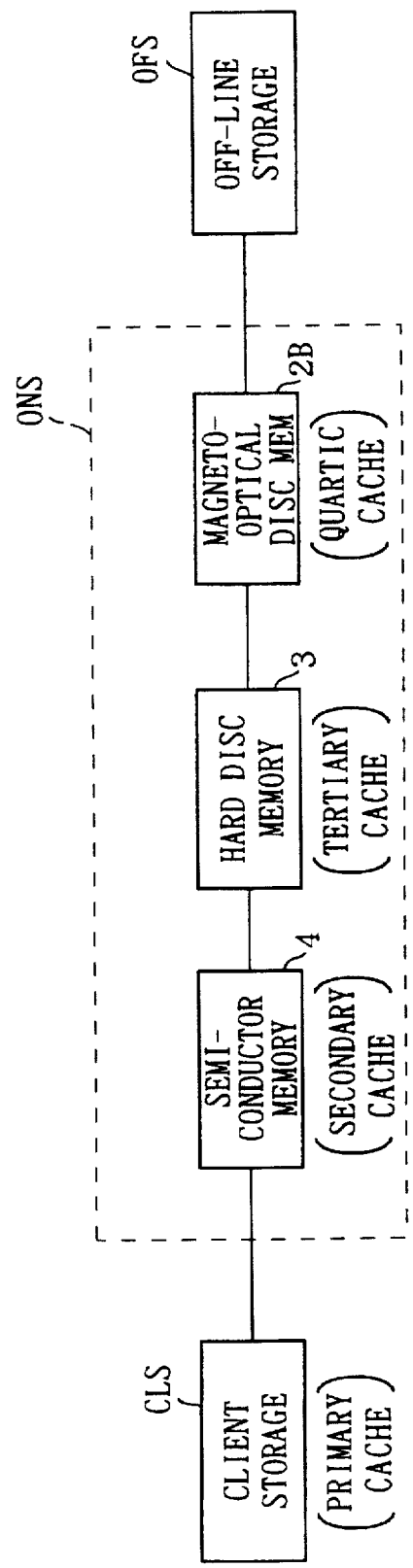
FIG. 11 is a block diagram illustrating the file staging in the data storage processing apparatus.

(7-2) FIG. 11 shows another embodiment of the present invention. The data storage processing apparatus shown in FIG. 11 hierarchically arranges from the client storage CLS to the off-line storage OFS according to access speed of the storage. This is equivalent to FIG. 9, but here each storage is treated as a cache. The client storage CLS closest to the client (the storage having the fastest access speed to the client) is called the primary cache, and in the order of decreasing access speed, the semiconductor memory 4 is called the secondary cache, the hard disc memory 3 is the tertiary cache and the magneto-optical disc memory 2B of auto changer 2 is called the quartic cache. This is the way of thinking equivalent to those of the primary cache and secondary cache for the main storage memory (semiconductor memory) of the micro-processor but extended to storages including off-line.

According to the foregoing construction, files in the file systems are accessed by the client who constructed the file systems, such as the server file system SFS, off-line file systems OFFS1, OFFS2 on the hierarchical storages. However, in the case of FIG. 11, files are automatically migrated by the storage manager SGM which each garden GDN has only one, being staged in the high speed cache, such as the client storage CLS and the semiconductor memory 4 (finally staged in the primary cache), or being staged in the low speed cache such as the auto changer 2 (finally staged in the off-line storage OFS). Thus, the access performance of the file to be frequently accessed will be improved, and hierarchical storages can be effectively utilized.

Furthermore, in the data storage processing apparatus 1, files in the server file system SFS which are accessed by the client, is arranged on the magneto-optical disc memory 2B of the auto changer 2 and these files will migrate by the staging between caches according to the access frequency of the files as the time passes. However, gathering of the statistical data, such as access frequency of the file by the client, and their lives on the storage and cache, is executed by the storage manager SGM.

Thus, the user of this data storage processing apparatus 1 can analyze the operating condition of the data storage processing apparatus 1 and the utilization condition of resources of the data storage processing apparatus 1 which is used in the application. Furthermore, as a result of the statistical data analysis by the user, distributions of applications and resources of the data storage processing apparatus 1, and the processing speed tuning can be executed.

In addition to the above, the garden manager GDM which each garden GDN has only one, manages the statistical data in the data storage processing apparatus 1, and by applying the on-line and off-line media management, useless files having very low access frequency formed by the user on the on-line storage can be automatically removed as off-line files, and the on-line media on which the files are arranged can be outputted to off-line according to the procedure described above.

Figure 12:
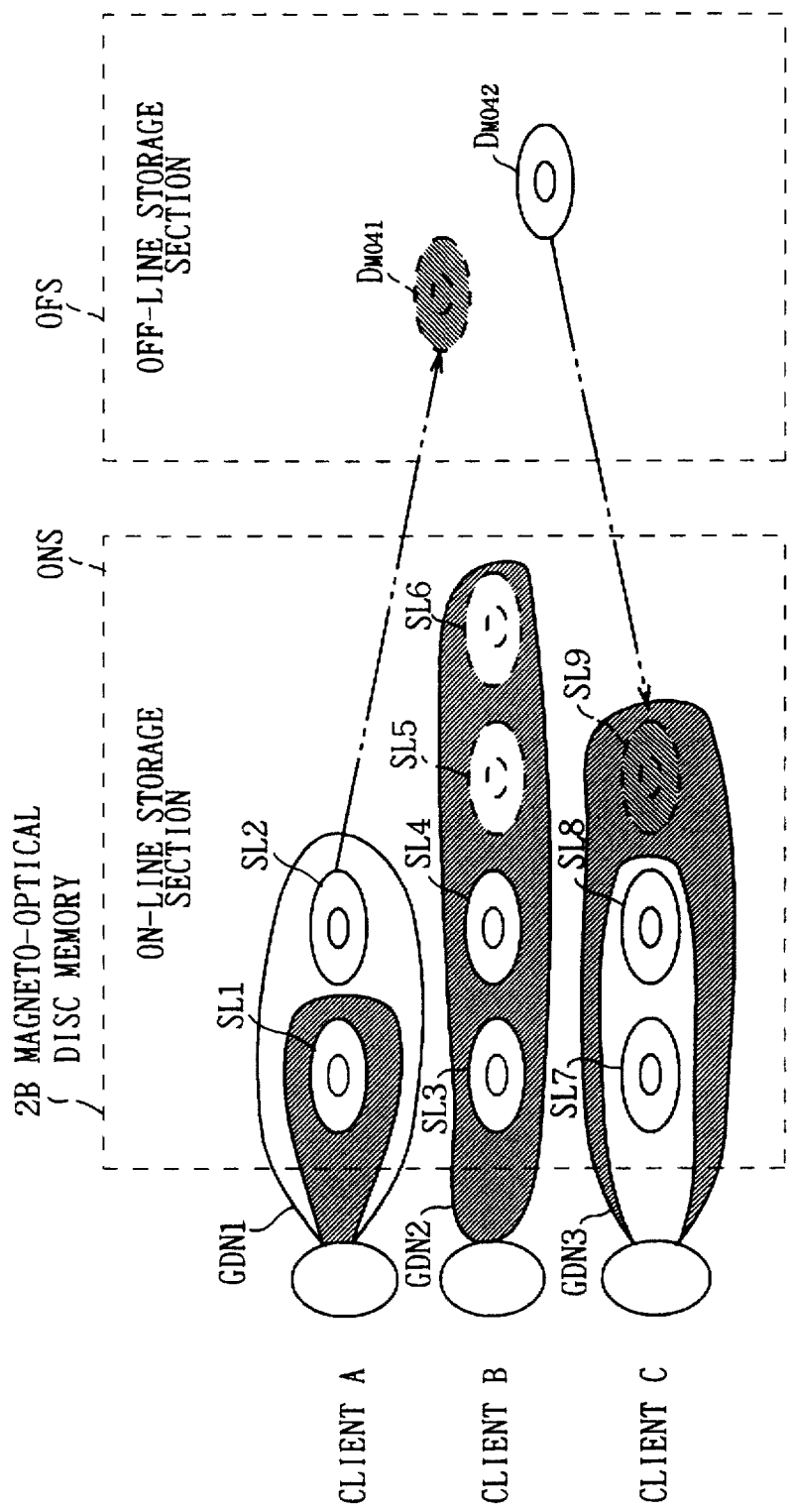
FIG. 12 is a linear diagram illustrating the slot management of removable storage in the data storage processing apparatus.

As shown in FIG. 12, the processing for removing the off-line file can be done by executing the slot management for the magneto-optical disc as a removable storage in the auto changer 2. FIG. 12 shows capacities of the magneto-optical disc memory 2B in storage resources QA3, QB3, QC3 of each garden GDN1, GDN2, GDN3 of FIG. 9 (having capacities according to the number of slots in the cartridge 28 (FIG. 8)).

At present, clients A, B and C which have gardens GDN1, GDN2 and GDN3 have slots (SL1, SL2), (SL3–SL6) and (SL7–SL9) respectively, and magneto-optical discs are inserted in all slots as removable storage media. For explanation, let it be supposed that the maximum number of slots of the auto changer 2 having the magneto-optical disc memory 2B is 8 slots SL1–SL8 and no vacant slot exists at present.

By applying the automatic adjustment of the on-line capacities based on the statistical data described above, the garden manager GDM having the on-line media in which the server file system SFS with low access frequency is placed is called out by the server manager SVM for the client C's access request to the off-line storage media, i.e., magneto-optical disc Dmo42, and the on-line media is automatically migrated to the off-line media.

For example, the magneto-optical disc as a storage media possessed by the client A's garden GDN1 in the slot SL2 is outputted as the off-line storage media Dmo41. Thus, the off-line storage media Dmo42 can be migrated to the client C's garden GDN3 on-line and can be functioned as the on-line storage media of slot SL9. At this point, the client A's garden GDN1 dynamically changes to have one slot SL1 and the client C's garden GDN3 dynamically changes to have three slots SL7, SL8, SL9.

Accordingly, by dynamically changing the number of slots of the auto changer 2 of the magneto-optical disc that can be possessed by the garden GDN1, GDN3 of the client A, C corresponding to the access frequency and file size of the client's file, the client's files to be frequently accessed can be kept in on-line.

Furthermore, according to this embodiment, slots of the auto changer 2 of the magneto-optical disc possessed by gardens GDN1, GDN3 of clients A, C are dynamically changed. However, this does not apply to slots owned by the client B's garden GDN2. These slots are allocated to the client B's garden GDN2 as slots for exclusive use for the garden GDN2 by the user.

The magneto-optical disc as removable storage media is inserted in slots SL3 and SL4 of the client B's garden GDN2, but no removable media is inserted to slots SL5 and SL6, i.e., vacant condition. Under these circumstances, slots SL5 and SL6 will not be allocated to other clients A's, C's gardens GDN1, GDN3, but the client B's garden GDN2 can exclusively possess slots SL5, SL6. Thus, the client B can use slots SL5 and SL6 exclusively regardless of access frequency of files as occasion demands.

(7-3) The embodiment described above has dealt with the case of the data storage processing apparatus 1 wherein the magneto-optical disc memory 2B comprising the semiconductor memory 4, the hard disc memory 3 and the loading/unloading device 2A as the storage is hierarchized according to access speed and storage capacity as the hierarchization condition. However, the storage and hierarchization condition is not only limited to the above but also the write once and read many times write once type optical disc, read only optical disc, sequentially accessible tape streamer, etc. may be applied as storage and the hierarchization may be executed according to feature and characteristics of the storage applied.

(8) Advantages of the Embodiment

According to the foregoing construction, since the storages inclusive of off-line storage media can be offered as the storages by building up the device construction having storage hierarchization including off-line storages which cannot be accessed on-line and the management system of storages and files which can be obtained by the software including off-line, the data storage processing apparatus capable of improving the usability of users and expanding its storage capacity practically without limitation can be obtained and unfairness among users can be removed.

Furthermore, according to the foregoing construction, by arranging the hard disc 6 to the auto changer 2 of magneto-optical disc as a cache, files to be used frequently are automatically staged in the hard disc 6 and files can be read or written by the performance of the hard disc 6. Also, files on the removable media on the off-line can be treated as if they were on-line files on the server by the file media management including off-line media.

Furthermore, according to the foregoing construction, at the time when the client accesses the file which does not exist on the on-line, the system can inform the client to insert the off-line media wherein the file exists. Moreover, at the time when new removable media is inserted, by automatically writing media information comprising electronic labels and posting visually recognizable labels on the media, users can control the off-line media more easily and certainly and simultaneously, can transfer the off-line media to on-line.

Moreover, according to the foregoing construction, by automatically outputting files having low access frequency to off-line, the on-line storage capacity can be increased to 3–10 times. Besides, the client's useless files can be automatically rearranged. Furthermore, the directory in the off-line media outputted automatically to off-line is controlled as the virtual media on the on-line and can be migrated to the on-line on demand. Also, files having practically indefinite large capacity can be realized by controlling the file media including off-line media and effective utilization management of the on-line storage capacity.

Furthermore, according to the foregoing construction, various multiple storages can be easily mounted and the file system possessed by each storage can be mounted in the internal file system of its own. Thus, the client can access various file systems which he has in each storage as his own internal file system.

Furthermore, according to the foregoing construction, by collecting statistical information on access frequency, the present storage location and cache life length of clients' files, users can analyze the operating condition of the server and the utilization condition of the server source. And the application and server performance tuning can be executed depending on the analysis result.

Moreover, according to the foregoing construction, since the system automatically secures and releases the number of slots of the auto changer of the magneto-optical disc which is allocated to each client corresponding to the access frequency and size of the file, the on-line capacity of each client can be automatically adjusted and the client's file to be accessed frequently can be remained in on-line. Also, since slots are locked by the client for his exclusive use, the client can exclusively use them with the specific application regardless of file access frequency. Besides, the client can commonly use them with the other clients who share the same application such as a database.

Industrial Applicability

The data storage processing apparatus according to the present invention can be utilized by a variety of clients who require large capacity storage device, and can be utilized for the accumulation of electronic publishing data, stock data and catalog publishing data.

Moreover, the data storage processing apparatus according to the present invention can be utilized for the document image processing, such as preservation of attested copy of government document and preservation of drawings on patents.

Furthermore, the data storage processing apparatus according to the present invention can be used for the game software developing business.

I claim:

1. A data storage processing apparatus comprising:

storing means for storing multiple path map information;

accessing means for accessing storage media;

controlling means for controlling said storing means and said accessing means based on command; and said path map information comprising, file system information indicating the type of file systems;

file type information stored as a plurality of entries with respect to said file system information to identify a file and a directory to be accessed under the file system shown by said file system information and a mounting point indicating switching point to other file system; and pointer information indicating the storage position of path map information with respect to said other file systems in the case said file type information is said mount point; and wherein said controlling means operates under first file system according to inputted command depending on first file system information and detects file to which access is requested by said command from said path map information, and reads out other path map information based on said pointer information, and controls to access a file to which access is requested under file system indicated by file system information contained in the other path map information which has been read out.

* * * * *